United States Patent
Madsen et al.

(10) Patent No.: US 11,269,346 B2
(45) Date of Patent: Mar. 8, 2022

(54) 3-D IMAGE SYSTEM FOR VEHICLE CONTROL

(71) Applicant: AGJUNCTION LLC, Hiawatha, KS (US)

(72) Inventors: Tommy Ertboelle Madsen, Fremont, CA (US); Anant Sakharkar, San Jose, CA (US)

(73) Assignee: AGJUNCTION LLC, Scottsdale, AZ (US)

( * ) Notice: Subject to any disclaimer, the term of this patent is extended or adjusted under 35 U.S.C. 154(b) by 0 days.

(21) Appl. No.: 16/012,103

(22) Filed: Jun. 19, 2018

(65) Prior Publication Data

US 2018/0373264 A1 Dec. 27, 2018

Related U.S. Application Data

(60) Provisional application No. 62/523,667, filed on Jun. 22, 2017.

(51) Int. Cl.
| | |
|---|---|
| G05D 1/02 | (2020.01) |
| G05D 1/00 | (2006.01) |
| G01S 19/45 | (2010.01) |
| G01C 21/30 | (2006.01) |

(52) U.S. Cl.
CPC .......... *G05D 1/0251* (2013.01); *G01C 21/30* (2013.01); *G01S 19/45* (2013.01); *G05D 1/0088* (2013.01); *G05D 1/0253* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 5,194,851 | A | 3/1993 | Kraning et al. |
| 5,390,125 | A | 2/1995 | Sennott et al. |
| 5,663,879 | A | 9/1997 | Trovato et al. |
| 5,923,270 | A | 7/1999 | Sampo et al. |
| 6,052,647 | A | 4/2000 | Parkinson et al. |

(Continued)

FOREIGN PATENT DOCUMENTS

| | | | |
|---|---|---|---|
| CN | 103954275 | * | 2/2017 |
| EP | 3170381 A1 | | 5/2017 |

OTHER PUBLICATIONS

David Ball, Vision based Obstacle Detection and Navigation for an Agricultural Robot (Year: 2016).*

(Continued)

*Primary Examiner* — Yuen Wong
*Assistant Examiner* — Hongye Liang
(74) *Attorney, Agent, or Firm* — Schwabe Williamson & Wyatt

(57) ABSTRACT

A control system uses visual odometry (VO) data to identify a position of the vehicle while moving along a path next to the row and to detect the vehicle reaching an end of the row. The control system can also use the VO image to turn the vehicle around from a first position at the end of the row to a second position at a start of another row. The control system may detect an end of row based on 3-D image data, VO data, and GNSS data. The control system also may adjust the VO data so the end of row detected from the VO data corresponds with the end of row location identified with the GNSS data.

20 Claims, 22 Drawing Sheets

(56) References Cited

U.S. PATENT DOCUMENTS

| | | | |
|---|---|---|---|
| 6,070,673 A | 6/2000 | Wendte | |
| 6,212,453 B1 | 4/2001 | Kawagoe et al. | |
| 6,373,432 B1 | 4/2002 | Rabinowitz et al. | |
| 6,377,889 B1 | 4/2002 | Soest | |
| 6,445,983 B1 | 9/2002 | Dickson et al. | |
| 6,539,303 B2 | 3/2003 | McClure et al. | |
| 6,711,501 B2 | 3/2004 | McClure et al. | |
| 6,789,014 B1 | 9/2004 | Rekow et al. | |
| 6,819,780 B2 | 11/2004 | Benson et al. | |
| 6,865,465 B2 | 3/2005 | McClure | |
| 6,876,920 B1 | 4/2005 | Mailer | |
| 7,117,087 B2* | 10/2006 | Jung | G01C 21/30 701/446 |
| 7,142,956 B2 | 11/2006 | Heiniger et al. | |
| 7,162,348 B2 | 1/2007 | McClure et al. | |
| 7,277,792 B2 | 10/2007 | Overschie | |
| 7,373,231 B2 | 5/2008 | McClure et al. | |
| 7,400,956 B1 | 7/2008 | Feller et al. | |
| 7,437,230 B2 | 10/2008 | McClure | |
| 7,460,942 B2 | 12/2008 | Mailer | |
| 7,542,825 B2* | 6/2009 | Kawasaki | G01D 1/16 280/735 |
| 7,689,354 B2 | 3/2010 | Heiniger et al. | |
| RE41,358 E | 5/2010 | Heiniger et al. | |
| 7,835,832 B2 | 11/2010 | Macdonald et al. | |
| 7,885,745 B2 | 2/2011 | McClure et al. | |
| 8,018,376 B2 | 9/2011 | McClure et al. | |
| 8,190,337 B2 | 5/2012 | McClure | |
| 8,214,111 B2 | 7/2012 | Heiniger et al. | |
| 8,311,696 B2 | 11/2012 | Reeve | |
| 8,386,129 B2 | 2/2013 | Collins et al. | |
| 8,401,704 B2 | 3/2013 | Pollock et al. | |
| 8,489,291 B2 | 7/2013 | Dearborn et al. | |
| 8,521,372 B2 | 8/2013 | Hunt et al. | |
| 8,548,649 B2 | 10/2013 | Guyette et al. | |
| 8,583,315 B2 | 11/2013 | Whitehead et al. | |
| 8,583,326 B2 | 11/2013 | Collins et al. | |
| 8,589,013 B2 | 11/2013 | Pieper et al. | |
| 8,594,879 B2 | 11/2013 | Roberge et al. | |
| 8,634,993 B2 | 1/2014 | McClure et al. | |
| 8,639,416 B2 | 1/2014 | Jones et al. | |
| 8,649,930 B2 | 2/2014 | Reeve et al. | |
| 8,676,620 B2 | 3/2014 | Hunt et al. | |
| 8,718,874 B2 | 5/2014 | McClure et al. | |
| 8,768,558 B2 | 7/2014 | Reeve et al. | |
| 8,781,685 B2 | 7/2014 | McClure | |
| 8,803,735 B2 | 8/2014 | McClure | |
| 8,897,973 B2 | 11/2014 | Hunt et al. | |
| 8,924,152 B2 | 12/2014 | Hunt et al. | |
| 9,002,565 B2 | 4/2015 | Jones et al. | |
| 9,002,566 B2 | 4/2015 | McClure et al. | |
| 9,141,111 B2 | 9/2015 | Webber et al. | |
| 9,162,703 B2 | 10/2015 | Miller et al. | |
| 9,173,337 B2 | 11/2015 | Guyette et al. | |
| 9,223,314 B2 | 12/2015 | McClure et al. | |
| 9,255,992 B2 | 2/2016 | McClure | |
| 9,389,615 B2 | 7/2016 | Webber et al. | |
| 2002/0072850 A1 | 6/2002 | McClure et al. | |
| 2004/0186644 A1 | 9/2004 | McClure et al. | |
| 2006/0074496 A1* | 4/2006 | Taware | G05B 9/02 700/11 |
| 2006/0167600 A1 | 7/2006 | Nelson, Jr. et al. | |
| 2009/0234578 A1* | 9/2009 | Newby | G08G 1/096827 701/408 |
| 2010/0274452 A1 | 10/2010 | Ringwald et al. | |
| 2014/0266877 A1 | 9/2014 | McClure | |
| 2014/0277676 A1 | 9/2014 | Gattis | |
| 2015/0157414 A1 | 6/2015 | Van Curen | |
| 2015/0175194 A1 | 6/2015 | Gattis | |
| 2016/0039454 A1 | 2/2016 | Mortimer | |
| 2016/0154108 A1 | 6/2016 | McClure et al. | |
| 2016/0157414 A1* | 6/2016 | Ackerman | A01B 69/008 701/25 |
| 2016/0180530 A1* | 6/2016 | Friend | G01S 7/4808 382/103 |
| 2016/8157414 | 6/2016 | Ackerman | |
| 2016/0205864 A1 | 7/2016 | Gattis et al. | |
| 2016/0214643 A1 | 7/2016 | Joughin et al. | |
| 2016/0252909 A1 | 9/2016 | Webber et al. | |
| 2016/0334804 A1 | 11/2016 | Webber et al. | |
| 2018/0095474 A1* | 4/2018 | Batur | G01S 19/48 |
| 2018/0224863 A1* | 8/2018 | Fu | G01C 21/32 |
| 2018/0299893 A1* | 10/2018 | Qin | G05D 1/0246 |
| 2018/0340788 A1* | 11/2018 | Liu | G01C 21/28 |

OTHER PUBLICATIONS

Lijun Wei, "GPS and stereovision based visual odometry application to urban scene mapping and intelligent vehicle localization" (Year: 2011).*

Ji Zhang, "Mapping Orchards for Autonomous Navigation" (Year: 2014).*

Shepard et al., "High-Precision Globally-Referenced Position and Attitude via a Fusion of Visual SLAM, Carrier-Phase-Based GPS, and Inertial Measurements", The University of Texas at Austin, Austin, TX, May 2014, 20 pages.

Noh, Kwang-Mo, Self-tuning controller for farm tractor guidance, Iowa State University Retrospective Theses and Dissertations, Paper 9874, (1990).

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

Ball et al., David, "Vision-based Obstacle Detection and navigation for an Agricultural Robot: Navigation for an Agricultural Robot" Journal of field Robotics, vol. 33, No. 8, Jan. 13, 2016, pp. 1107-1130.

International Search Report and Written Opinion; Application No. PCT/US2018/038258; Filed: Jun. 19, 2018, pp.

International Preliminary Report on Patentability; Application No. PCT/US2018/038258; Filed: Jun. 19, 2018, dated Jan. 2, 2020.

* cited by examiner

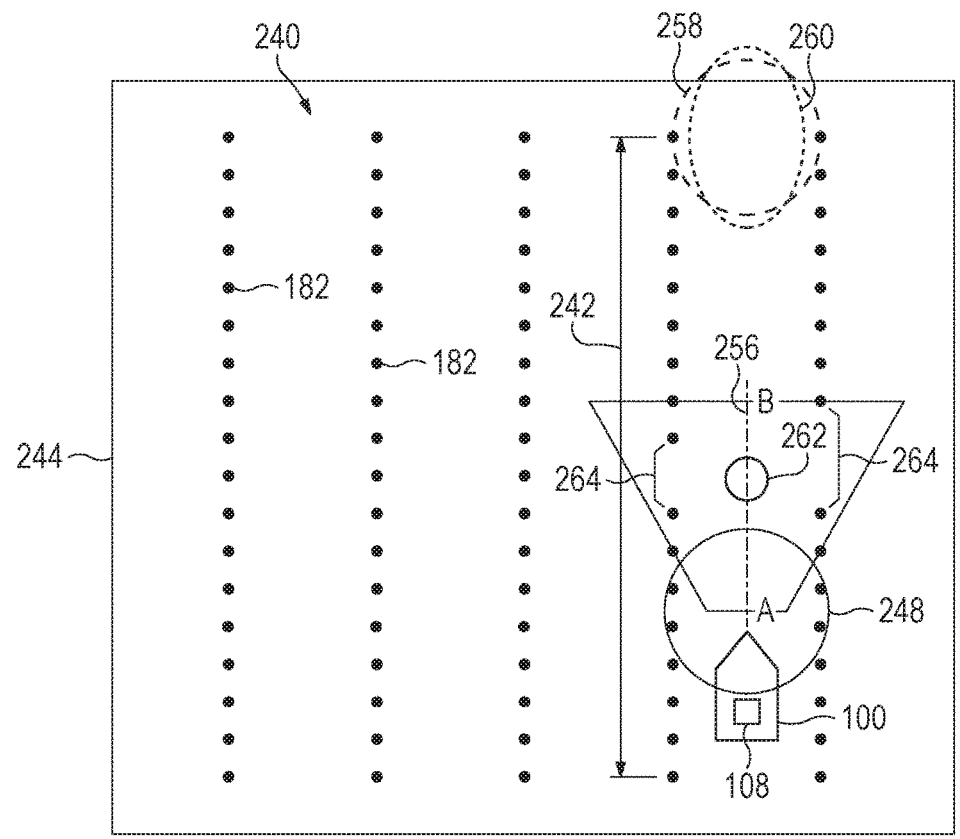
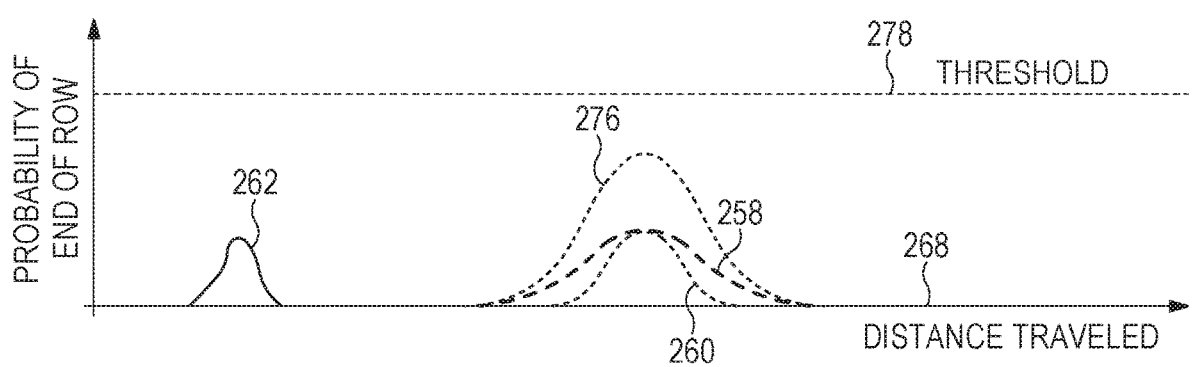
FIG. 17

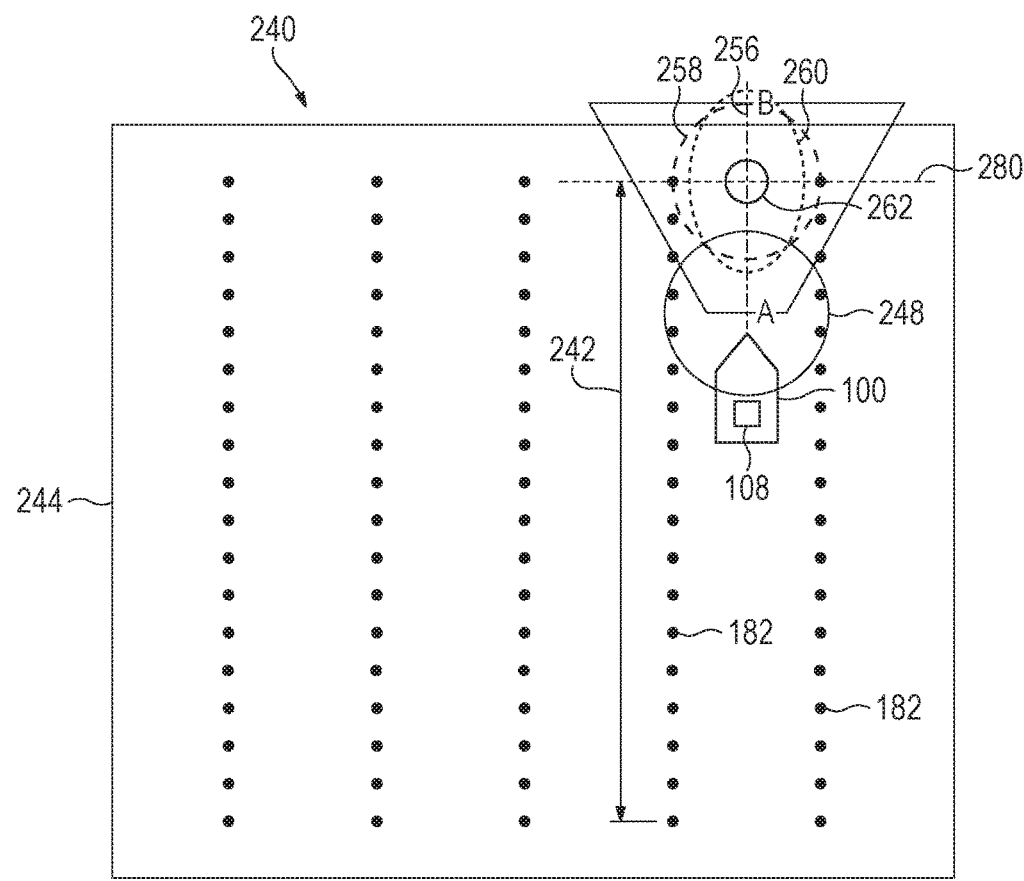
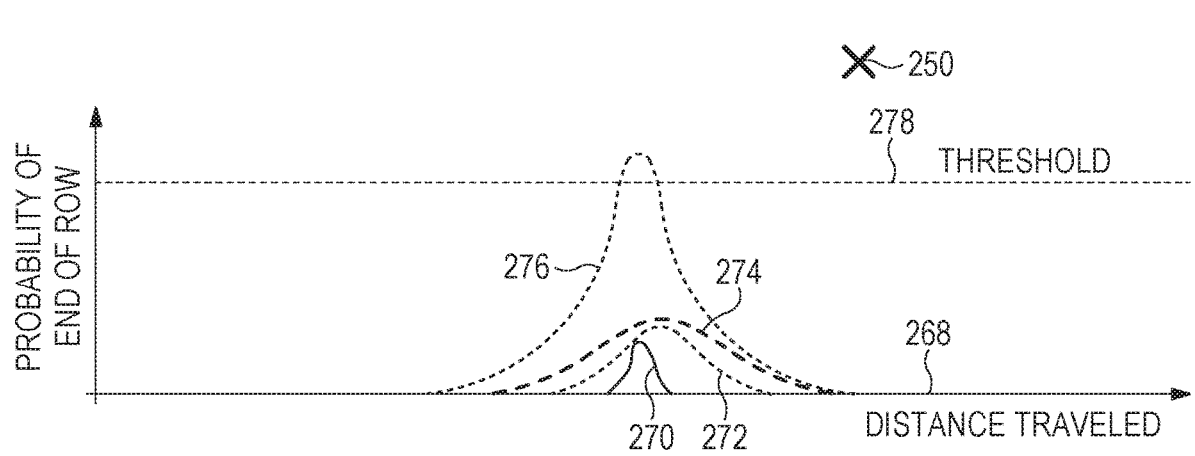
FIG. 18

3-D IMAGE SYSTEM FOR VEHICLE CONTROL

The present application claims priority to U.S. Provisional Patent Application Ser. No. 62/523,667 filed on Jun. 22, 2017, entitled: 3-D CAMERA SYSTEM FOR VEHICLE CONTROL which is incorporated by reference in its entirety.

TECHNICAL FIELD

One or more implementations relate generally to using an imaging system for controlling a vehicle.

BACKGROUND

An automatic steering system may steer a vehicle along a desired path. The steering system may use gyroscopes (gyros), accelerometers, and a global navigation satellite system (GNSS) to determine the location and heading of the vehicle. Other automatic steering system may use 3-dimensional (3-D) laser scanners, such as lidar, and/or stereo cameras to detect rows and other obstructions in a field. Another type of 3D camera that may be used could include a monocular camera.

GNSS requires a good line of sight to satellites. Trees, buildings, windmills etc. can degrade the GPS position to the point of no longer being available. This creates problems for farmers that need precise vehicle control systems. Products on the market try to solve this problem using wheel odometry, inertial navigation systems (INS), and getting the best out of available GNSS signals even though the signals have degraded, such as from real-time kinematic (RTK) fix to RTK float, etc.

Imaging systems also may drift and have varying accuracy based on the objects identified in the rows of the field. For example, plants may extend over adjacent rows or may form gaps within rows. These discontinuities may prevent the imaging system from accurately identifying the beginning, end, center-lines between rows, or the location of the vehicle within the row.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 1 shows how VO data is localized with GNSS data.

FIGS. 15-18 show how the control system determines an end of row based on probabilities of different end of row locations identified by 3-D data, VO data, and GNSS data.

DETAILED DESCRIPTION

Figure 1:
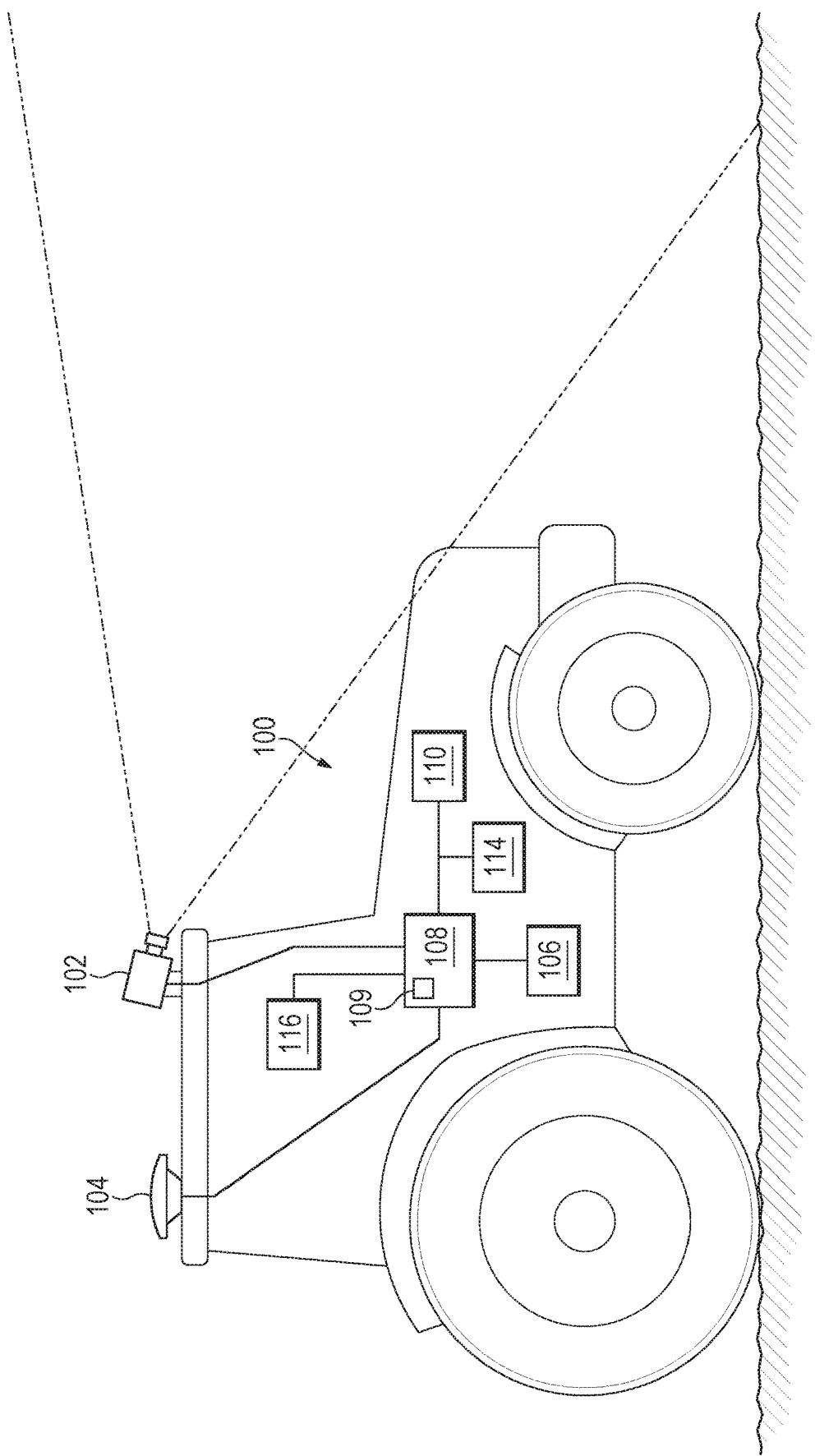
FIG. 1 is a diagram of a vehicle that includes a control system that uses 3-D image data, visual odometry (VO) data, and global navigation satellite system (GNSS) to automatically steer a vehicle.

FIG. 1 is a diagram of a vehicle 100, such as an agricultural vehicle or tractor. Vehicle 100 can be any machine that provides automatic steering. Vehicle 100 includes one or more three-dimensional (3-D) sensors 102, such as a stereo camera. Other 3-D sensor 102 can be used in combination with, or instead of, stereo camera 102. For explanation purposes, 3-D sensors 102 may be referred to below as a 3-D camera, but is should be understood that any other type of 3-D sensor may be used including, but not limited to, light detection and ranging (LIDAR) and/or radar devices.

A global navigation satellite system (GNSS) antenna 104 is typically located on top of the cabin of vehicle 100. The explanation below may refer to GNSS and global positioning systems (GPS) interchangeably and both refer to any locating system, such as a satellite or cellular positioning system, that provides latitude and longitude data and/or a position relative to true north. GNSS may include GPS (U.S.), Galileo (European Union, proposed), GLONASS (Russia), Beidou (China), Compass (China, proposed), IRNSS (India, proposed), QZSS (Japan, proposed), and other current or future positioning technology using signals from satellites, with or with augmentation from terrestrial sources.

An inertial navigation system 106 (INS) may include gyroscopic (gyro) sensors, accelerometers and similar technologies for providing outputs corresponding to the inertia of moving components in all axes, i.e., through six degrees of freedom (positive and negative directions along transverse X, longitudinal Y and vertical Z axes). Yaw, pitch and roll refer to moving component rotation about the Z, X, and Y axes respectively. Any other terminology used below may include the words specifically mentioned, derivative thereof, and words of similar meaning.

A control system 108 may include memory for storing an electronic map 109 of a field. For example, the latitude and longitude of rows in the field may be captured in electronic map 109 when the same or a different vehicle 100 travels over the field. For example, control system 108 may generate electronic map 109 while planting seeds in the field. Electronic map 109 may be based on available localization inputs from GNSS 104 and/or 3-D camera 102 and may identify any other objects located in or around the field.

Alternatively, electronic map 109 may be generated from satellite, plane, and/or drone images.

An auto steering system 110 controls vehicle 100 steering curvature, speed, and any other relevant vehicle function. Auto-steering system 110 may interface mechanically with the vehicle's steering column, which is mechanically attached to a vehicle steering wheel. Control lines may transmit guidance data from control system 108 to auto steering system 110.

A communication device 114 may connect to and allow control system 108 to communicate to a central server or to other vehicles. For example, communication device 114 may include a Wi-Fi transceiver, a radio, or other data sharing device. A user interface 116 connects to control system 108 and may display data received by any of devices 102-114 and allows an operator to control automatic steering of vehicle 100. User interface 116 may include any combination of buttons, levers, light emitting diodes (LEDs), touch screen, keypad, display screen, etc. The user interface can also be a remote UI in an office or on a mobile device.

Control system 108 uses GNSS receiver 104, 3-D camera 102, and INS 106 to more accurately control the movement of vehicle 100 through a field. For example, control system 108 may use 3-D camera 102 when GNSS 104 is not available, such as when vehicle 100 moves under trees. Control system 108 also does not need high precision GNSS 104, since only a rough GNSS position is needed to initialize electronic map 109. Control system 108 can then use image data from 3-D camera 102 to detect and navigate through rows of the field.

In one example, 3-D camera 102 is mounted in the front top center of the cabin of vehicle 100. Camera 102 looks forward and has a relatively wide field of view for features close to vehicle 100 and on the horizon. In other examples, 3-D camera 102 is located inside of the vehicle cabin and/or on a front hood of vehicle 100. Of course, 3-D cameras 102 may be located in any other location of vehicle 100.

Figure 2:
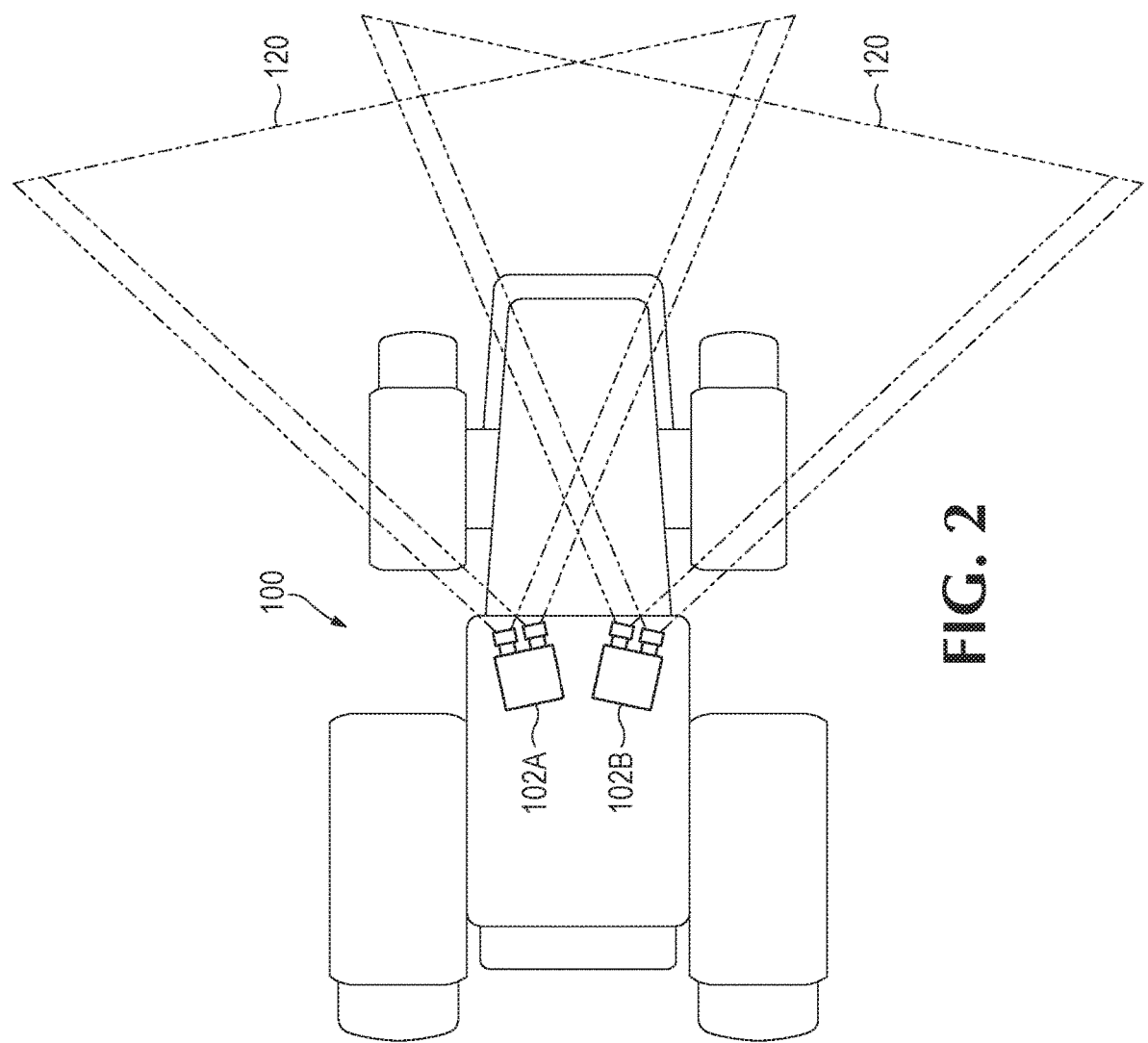
FIG. 2 shows a field of view for 3-D image sensors.

FIG. 2 shows a top view of vehicle 100 that includes two 3-D cameras 102A and 102B aligned in oppositely angled directions to increase a field of view 120 for guidance system 108. 3-D cameras 102 may look forward, to the sides, or backwards of vehicle 100. 3-D cameras 102 can also operate as a surround view or 360 degree view and can also include omnidirectional cameras that take a 360 degree view image. Again, any other type of 3-D sensor can also be used in combination or instead of 3-D camera 102.

Vehicle 100 may include lights to improve image quality of 3-D cameras 102 at night. Other sensors may be located on vehicle 100 and operate as a redundant safety system. For example, an ultrasonic and/or flex bumper may be located on vehicle 100 to detect and avoid hitting objects. Vehicle 100 may not only consider obstacles in the field of view, but also may map obstacles as they pass out of the field of view. Control system 108 may use the obstacle map to plan routes that prevent vehicle 100, or a trailer towed by vehicle 100, from hitting previously detected obstacles.

Figure 3:
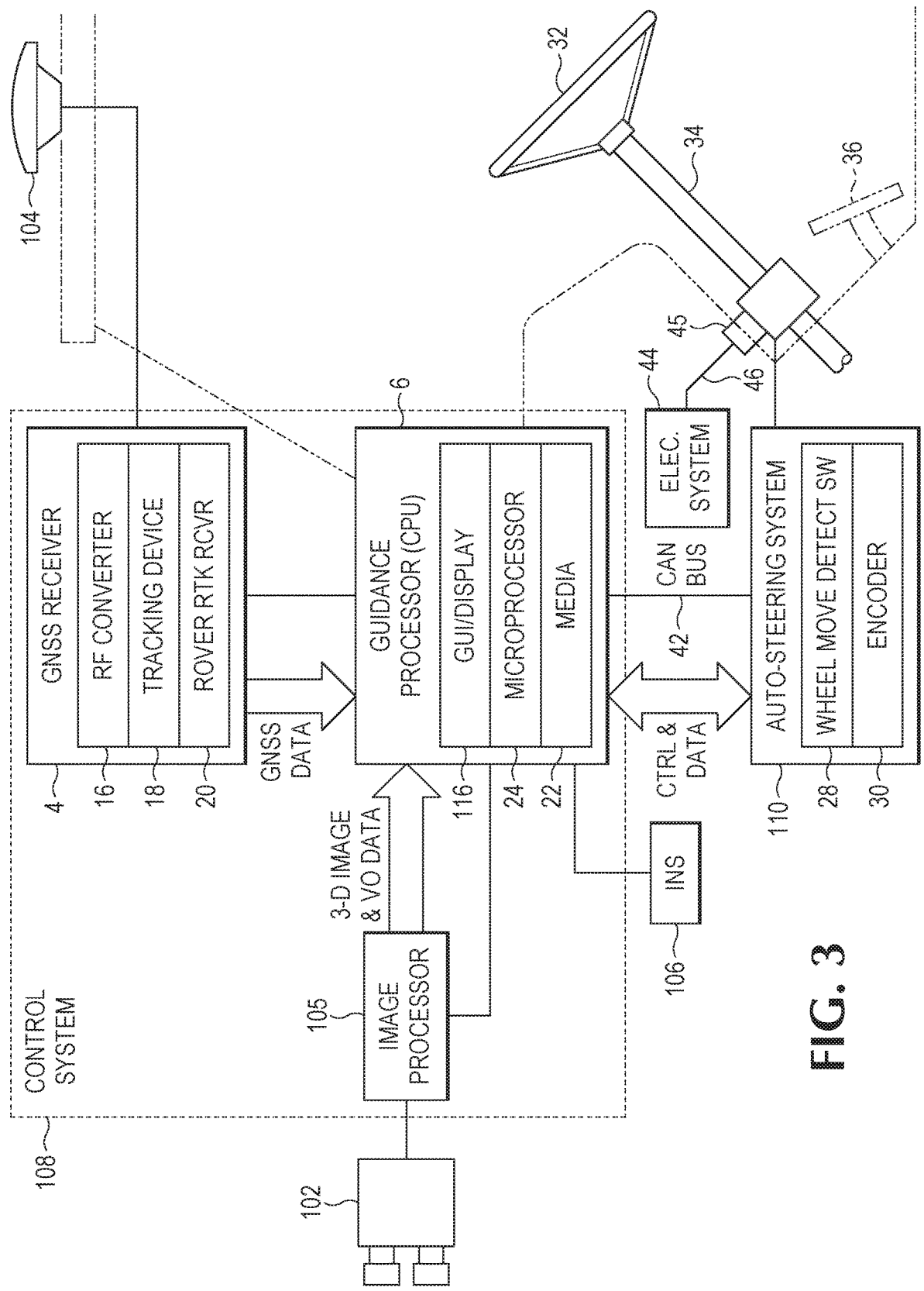
FIG. 3 is a more detailed diagram of the control system of FIG. 1.

FIG. 3 shows in more detail how control system 108 is used in conjunction with auto steering system 110. Control system 108 may include a guidance processor 6 that generally determines the desired path vehicle 100 takes through a field. Guidance processor 6 is installed in vehicle 100 and connects to GNSS antenna 104 via GNSS receiver 4, mechanically interfaces with vehicle 100 via auto steering system 110, and receives 3-D data and visual GNSS receiver 4 may include an RF convertor (i.e., downconvertor) 16, a tracking device 18, and a rover RTK receiver element 20. GNSS receiver 4 electrically communicates with, and provides GNSS positioning data to, guidance processor 6. Guidance processor 6 also includes graphical user interface (GUI) 116, a microprocessor 24, and a media element 22, such as a memory storage drive.

Image processor 105 processes the 3-D images from 3-D camera 102 to identify rows in a field and identify any other objects that guidance processor 6 uses to determine a path for steering vehicle 100. Image processor 105 may generate 2-D or 3-D image maps from the 3-D images and generate VO data and simultaneous localization and mapping (SLAM) data from the 3-D images as described in more detail below.

Guidance processor 6 electrically communicates with, and provides control data to auto-steering system 110. Auto-steering system 110 includes a wheel movement detection switch 28 and an encoder 30 for interpreting guidance and steering commands from guidance processor (CPU) 6. Auto-steering system 110 may interface mechanically with the vehicle's steering column 34, which is mechanically attached to a steering wheel 32.

A controller area network (CAN) bus 42 may transmit guidance data from the CPU 6 to auto-steering system 110. An electrical subsystem 44, powers the electrical needs of vehicle 100 and may interface directly with auto-steering system 110 through a power cable 46. Auto-steering subsystem 110 can be mounted to steering column 34 near the floor of the vehicle, and in proximity to the vehicle's control pedals 36 or at other locations along steering column 34.

Auto-steering system 110 physically drives and steers vehicle 100 by actively turning steering wheel 32 via steering column 34. A motor 45 is powered by vehicle electrical subsystem 44 and may power a worm drive which powers a worm gear affixed to auto-steering system 110. These components are preferably enclosed in an enclosure. In other embodiments, auto-steering system 110 is integrated directly into the vehicle drive control system independently of steering column 34.

Using Visual Odometry to Identify Vehicle Position and Perform Row Turns

Control system 100 may use VO algorithms to calculate the pose and trajectory of vehicle 100 by chronologically analyzing images in scenes or frames. The VO algorithms process the captured images in chronological order and track movements of the images from one frame to a next frame. Both the position and orientation of vehicle 100 is determined based on the tracked movement of the images, or sparse features in the images from image to image. Control system 100 uses the image movements tracked by 3-D camera 102 in combination with GNSS data from GNSS receiver 104 and turn rates and accelerations from INS 106 to more reliably determine the heading and position of vehicle 100 along a desired path.

One example algorithm used for calculating the pose and trajectory of vehicle 100 based on VO data is described in U.S. Pat. No. 8,155,870 which is incorporated by reference in its entirety. Algorithms using VO data to identify the position of a device are known to those skilled in the art and are therefore not explained in further detail.

Figure 4:
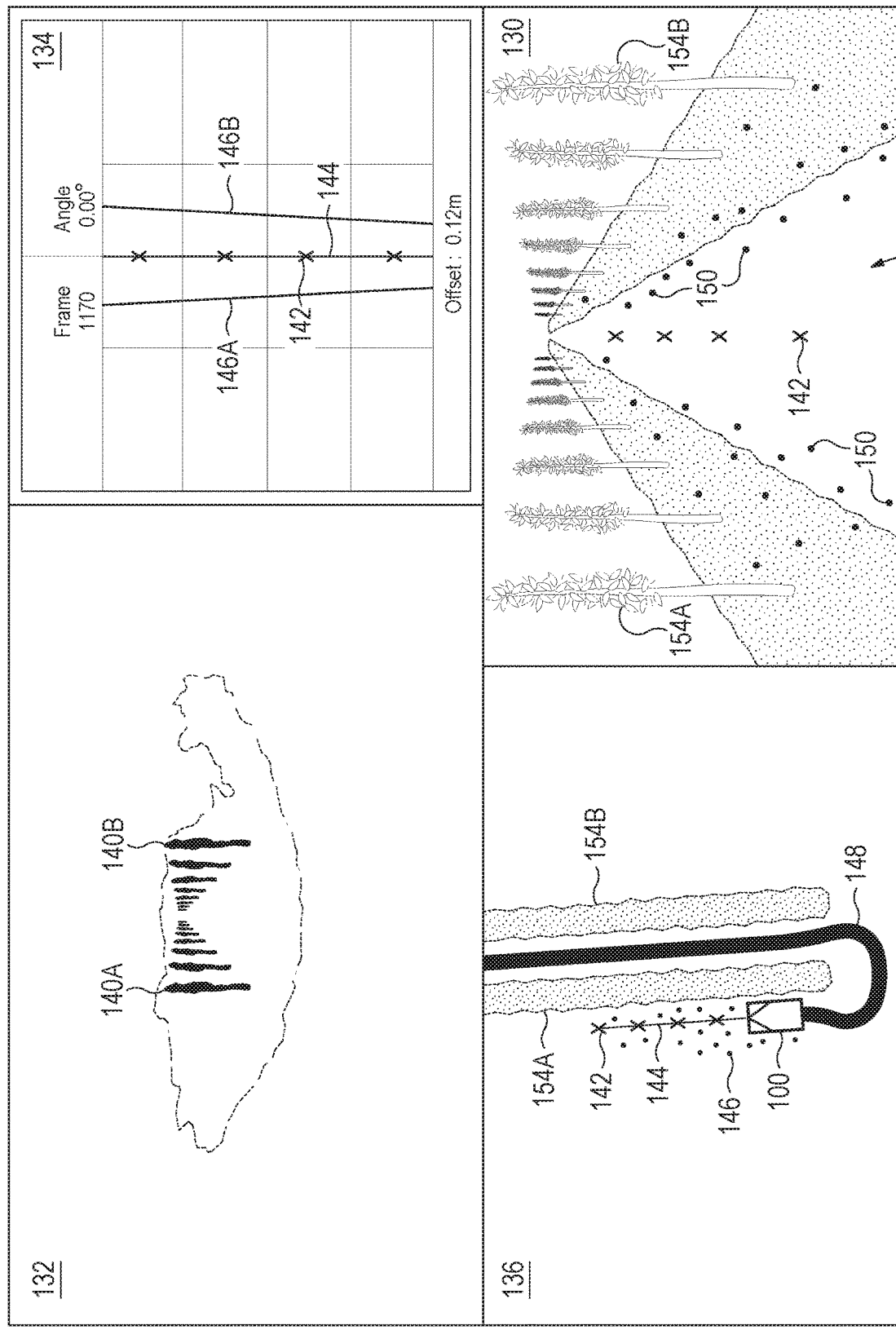
FIG. 4 shows image data generated from rows in a field.

FIG. 4 shows different image data produced from 3-D camera 102 in FIG. 1. 3-D camera 102 may generate a sequence of multiple images 130 as vehicle 100 travels along a path 152 in between two rows 154A and 154B of trees in an orchard. The image data described below may be generated by image processor 105 in FIG. 3 and used by guidance processor 6 in FIG. 3 to steer vehicle 100 along desired path 152. However, any combination of image processor 105 and guidance processor 6 may perform any combination of the image processing operations and vehicle steering operations described below. For this reason, the image processing operations and vehicle steering operations are described generally below with respect to control system 108.

Control system 108 generates a 3-D point cloud map 132 from the series of images 130 generated by 3-D camera 102. Control system 108 may identify objects 140A and 140B that are a particular height above the ground, such as trees in rows 154A and 154B, respectively.

For example, control system 108 may add up points in point cloud map 132 that are a certain height above ground level to create a 2D height histogram. Control system 108 then detects tree lines 154 in the 2D histogram by using line fitting approaches like Hough or RANSAC. Another method detects tree lines 154 by looking for vertical cylinders in point cloud map 132. Control system 108 may augment point cloud map 132 with other image information, such as feature descriptions, that provide more robust tracking from image to image and also provide better re-localization.

Control system 108 generate lines 146A and 146B in 2-D image data 134 that represent peak pixel values in objects 140A and 140B and identify the location of rows 154A and 154B, respectively. Control system 108 locates a centerline 144 between lines 146A and 146B that represents the A-B line or desired path 152 for vehicle 100 to travel in-between rows 154A and 154B.

Control system 108 also generates VO data 136 that identifies how much vehicle 100 moves in relation to best distinct feature points 150 across the image frames 130. For example, control system 108 detects different features or "corners" 150 in image data 130. Control system 108 identifies the same features 150 in subsequent 3-D image frames 130. Control system 108 figures out how much vehicle 100 moves based on the positional change in features 150. Control system 108 then displays the position and movement of vehicle 100 as position line 148 in VO data 136. Dots 146 represent the previous and present features 150 used by control system 108 to calculate position line 148. As show in FIG. 4, position line 148 identifies both a location and orientation of vehicle 100.

Path 152 between rows 154 may not be a straight line. Control system 108 may repeatedly identify new center line points 142 while traveling between rows 154. For example, after reaching one of centerline points 142, control system 108 calculates a next centerline point 142 in front of vehicle 100 and then steers vehicle 100 toward the next centerline point 142 along desired path 144.

Figure 5:
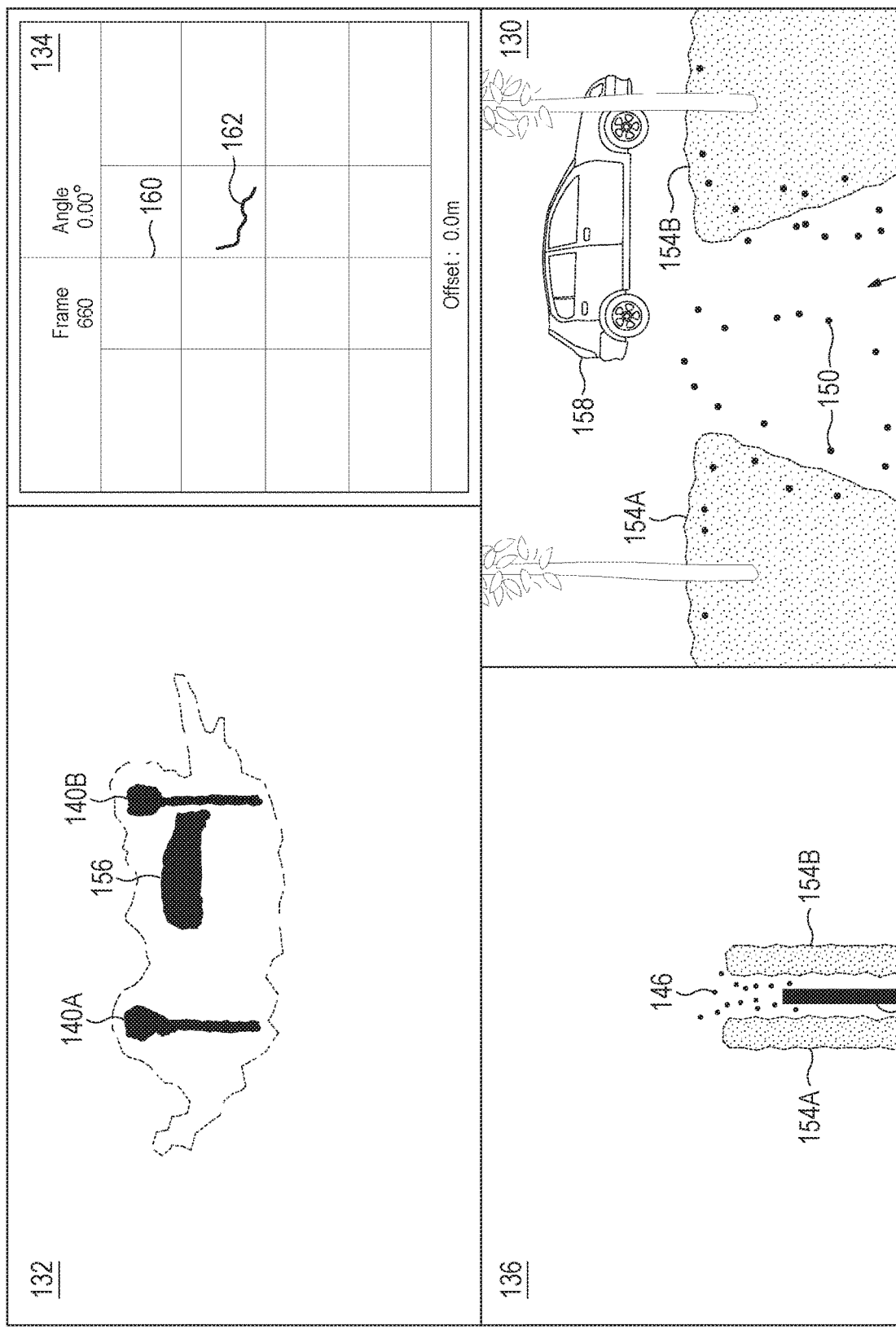
FIG. 5 shows image data identifying an end of row.

FIG. 5 shows image data 130 generated at the end of rows 154. Control system 108 detects the end of the three feet or higher trees in rows 154A and 154B and accordingly ends objects 140A and 140B in point cloud map 132. Control system 108 also detects a vehicle 158 at the end of row 154B and generates a new object 156 that extends transversely in front of row object 140B.

The end of rows 154A and 154B cause control system 108 to stop generating row lines 146 in 2-D map 134. With no identifiable row lines, control system 108 no longer generates centerline path 144 in FIG. 4. Accordingly, control system 108 displays a red line along vertical axis 160 indicating the end of rows 154. Control system 108 also may generate a 2-D line 162 representing car 158 that severely deviates from previous centerline 144 in FIG. 4. Control system 108 also generates VO data 136 that includes position line 148 identifying the position of vehicle 100 along path 152.

Control system 108 may detect the end of rows 154A and 154B based on the image data in FIG. 5. For example, the location of vehicle 100 associated with position line 148 in VO data 136 may correspond with an end of row location in stored electronic map 109 in FIG. 1. Control system 108 may determine the lat/long position of vehicle 100 at the start of each row and derive the length of each row from map 109. Position line 148 in VO data 136 identifies the distance vehicle 100 has moved from the start of row location. Control system 108 detects the end of row when the length of position line 148 reaches the row length identified in map 109.

The termination of 2-D row lines 146 and centerline 144 in 3-D map 134 also may indicate an end of row. The discontinuity created by angled line 162 also may indicate an object located an end of row. Control system 108 also may receive GNSS data from GNSS receiver 104 in FIG. 1. Control system 108 also may detect the end of row when the lat/long data from GNSS receiver 104 matches the stored lat/long position or length at the end of row.

Simultaneous Localization And Mapping (SLAM)

Figure 6:
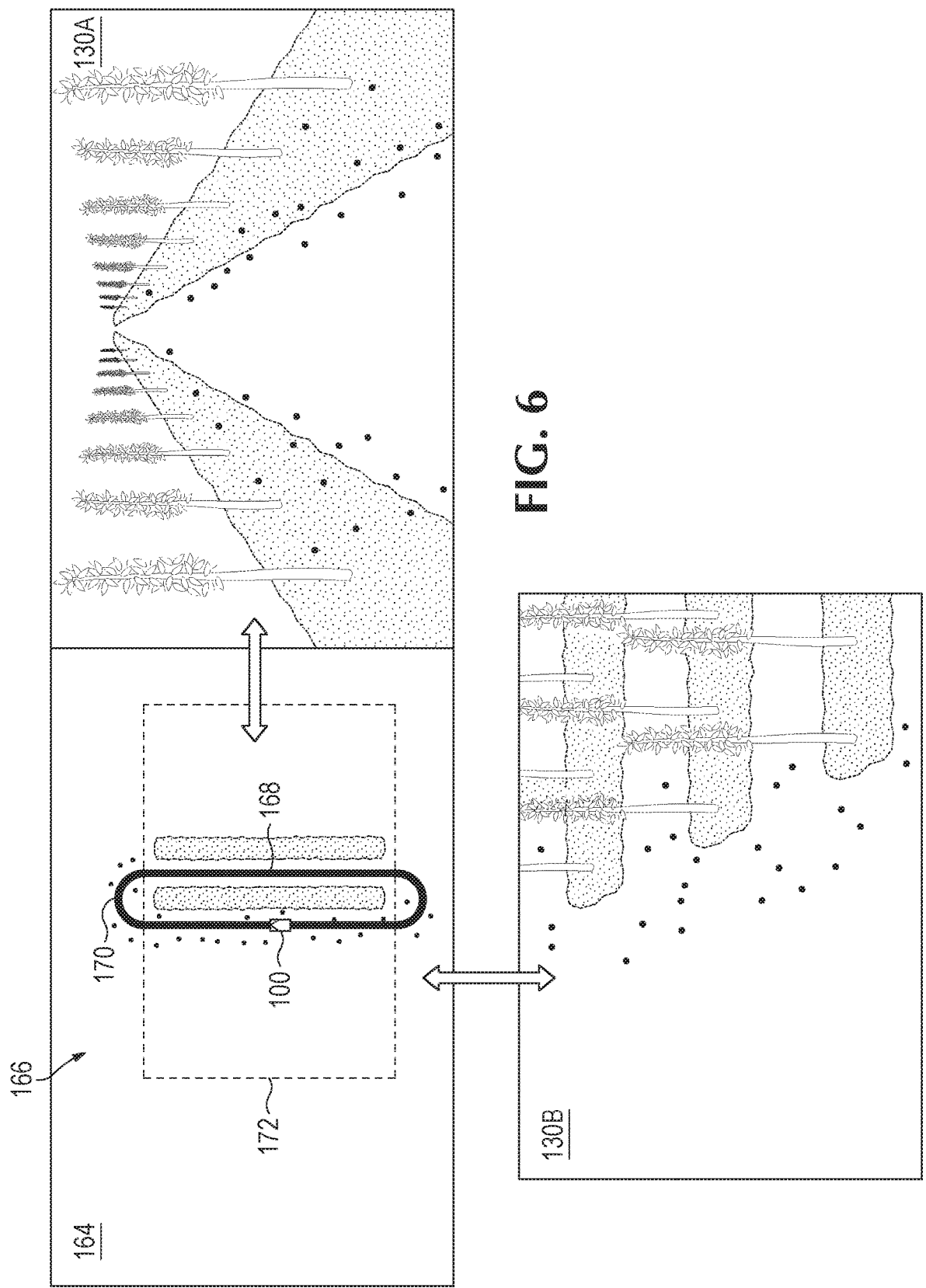
FIG. 6 shows a simultaneous localization and mapping (SLAM) map generated from the image data in FIGS. 4 and 5.

FIG. 6 shows a simultaneous localization and mapping (SLAM) map 166. Control system 108 creates SLAM map 166 from images 130A taken while vehicle 100 travels between rows of a field 164 and from images 130B taken while vehicle 100 turns around in the headland area of field 164. Control system 108 may identify the vehicle pose either from VO data, SLAM data, GNSS data, and/or INS data. As mentioned above, calculating vehicle orientation and pose based on VO and SLAM is known to those skilled in the art and is therefore not described in further detail.

SLAM map 166 may include both relatively straight sections 168 where vehicle 100 travels adjacent to the rows in field 164 and turn-around sections 170 in headland sections of field 164 where vehicle 100 turns around to travel next to another row in field 164. GNSS data may be available outside of area 172 and unavailable inside of area 172. For example, the trees within area 172 may prevent GNSS receiver 104 from reliably receiving GNSS satellite data.

Control system 108 may geographically locate SLAM map 166 with GNSS coordinates when available from GNSS receiver 104. Control system 108 may store SLAM map 166 online for easy updating by different vehicles working in the same field 164 and localizes vehicle 100 when placed in map 166.

Control system 108 may steer vehicle 100 around field 164 a first time to create SLAM map 166. Control system 108 then updates SLAM map 180 each subsequent run through field 164 to reflect changes in the environment. Control system 108 may continuously update and optimize SLAM map 166 based any new image data received from 3-D sensor 102 and GNSS data received from GNSS sensor 104. Integration of GNSS data with SLAM map 166 may be based on the quality of the GNSS signals and may be best in headland areas and other locations outside of area 172 GNSS sensor 104 has a clear view to the sky.

Whenever a strong GNSS signal is detected, control system 108 may mark that position in SLAM map 166 with the associated GNSS lat/long position and estimated position uncertainty. Control system 108 compares the GNSS lat/gong position with the VO position indicated in SLAM map 166. Control system 108 then may recalibrate the VO positions in SLAM map 166 to account for drift and correlate with the GNSS lat/long positions.

SLAM map 166 is desirable to plan the route of vehicle 100 around field 164 and can provide additional information allowing more robust performance of control system 108. However, control system 108 may perform many tasks without SLAM map 166, or any other electronic map, but possibly with less confidence and stopping when it can no longer figure out how to move on. Since typical fields are not perfectly rectangular or planted. SLAM map 164 can be augmented with further 3D points from the 3D sensor to provide a more dense 3D map of the field. This 3D map can be processed online/offline to provide additional verification of row locations, row distances, tree spacings, tree heights, tree types, etc.

A drone or other type of device may produce a geographic information system (GIS) map of field 164, such as used by Google Maps®. An operator may identify different sections of field 164 that require different amount of spraying, such as different amounts of fertilizer or pesticides. Control system 108 determines when vehicle 100 enters and leaves the different field sections based on the VO and GNSS positions as described above. Control system 108 then applies the different amounts of material identified in the GIS map, because it can calculate the position in GIS map even when GNSS is not available based on VO or SLAM.

Figure 7:
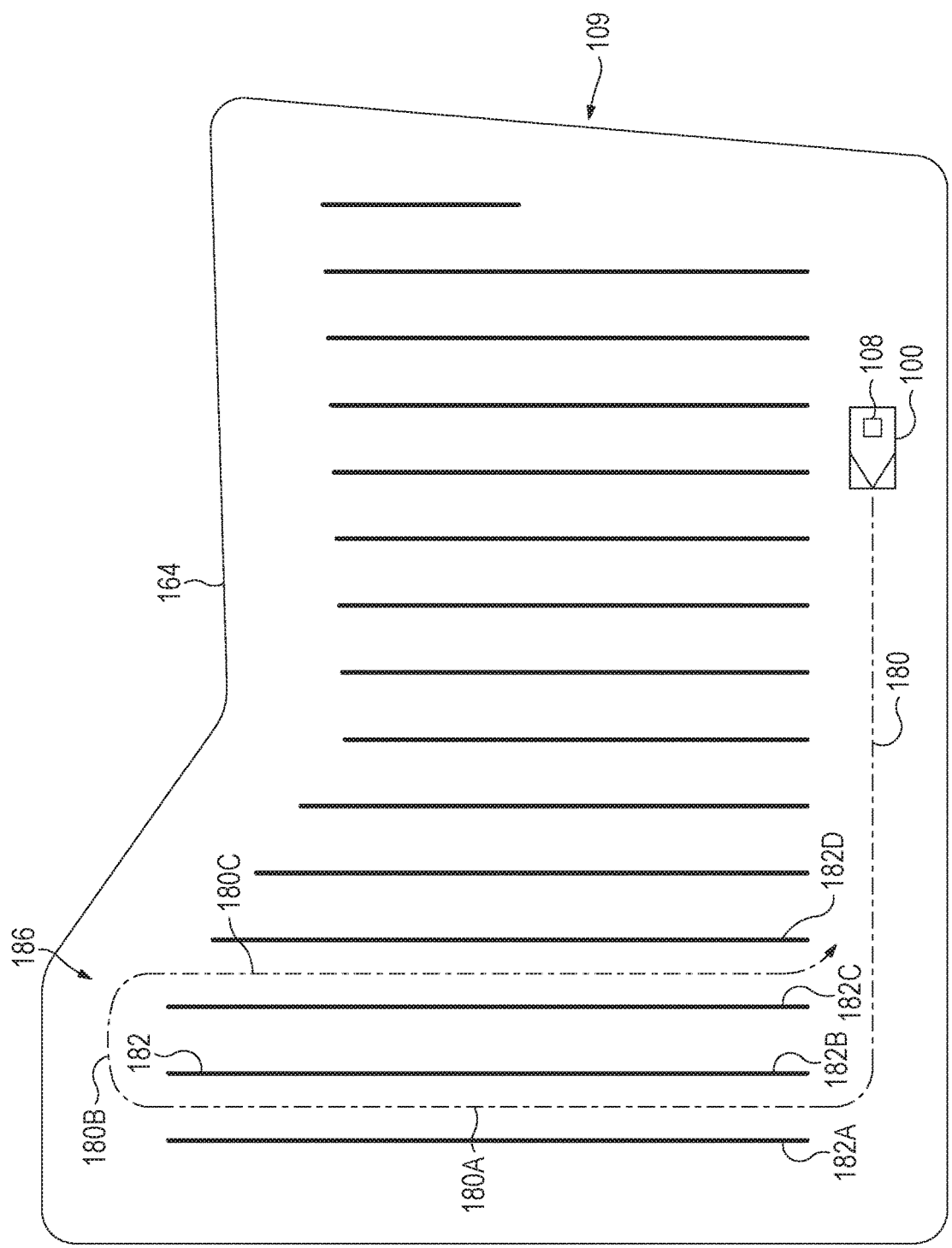
FIG. 7 shows a map with a path used in conjunction with VO data to steer a vehicle around a field.

FIG. 7 shows a GNSS or geographic information system (GIS) map 109 of field 164. Map 109 may be stored in control system 108 and may include lat/long information identifying the boundaries of field 164, row lengths, start of row locations, end of row locations, treelines, spatial data, obstructions, etc. When there is sufficient GNSS coverage, control system 108 may use GNSS signals to steer vehicle 100 along a path 180 to a starting position of row 182A. Start of row 182A could be a first row with one tree line left or right or typically with two tree lines, one on each side of vehicle 100.

Without GNSS signals, vehicle 100 may be manually steered to a known position in map 109 where control system 108 can recognize the start of row. If the start of row cannot be detected, a start of row may be entered in a job description indicating vehicle 100 starting in row x, driving in direction y, and in position z meters from the start of row that allows 3-D camera 102 to detect the row.

This is sufficient for control system 108 to then steer vehicle 100 through rows 182 without GNSS data or a prior generated SLAM map. As explained above, without GNSS data, control system 108 can use 3-D image data from the 3-D sensors to identify and steer vehicle 100 along the centerline between adjacent rows 182A and 182B that forms section 180A of path 180. However, control system 108 may also use GNSS data, when available, along with the image data to automatically steer vehicle 100 along path 180 in-between rows 182A-182D.

Control system 108 uses the 3D point cloud data to detect the end of row 182A. Control system 108 may use several different methods to then perform a turn 180B in headland area 186. In one example, map 109 identifies the distance between the end of path section 180A and the start of a next path section 180C. Control system 108 may perform a turn 180B with a predetermined radius that positions vehicle 100 at the start of path section 180C and at the beginning of rows 182C and 182D.

Control system 108 may perform turn 180B with or without the benefit of GNSS data. If GNSS data is available, control system 108 can continuously detect the location of vehicle 100 along turn 180B until reaching a lat/long position and orientation aligned with the beginning of rows 182C and 182D. If GNSS data is not available, control system 108 can use 3-D image data and associated VO pose data to complete the turn and to detect the beginning and center line between rows 182C and 182D.

When SLAM map 166 is available, control system 108 can localize anywhere in field 176 with or without additional GNSS data. If driving directions are changed, control system 108 updates SLAM map 166 in FIG. 6 to add additional features seen from the new driving directions. If big changes occur in field 164, such as leaves falling in the fall, control system 108 may fail to localize with SLAM map 166 and may default to only using map 109.

Figure 8:
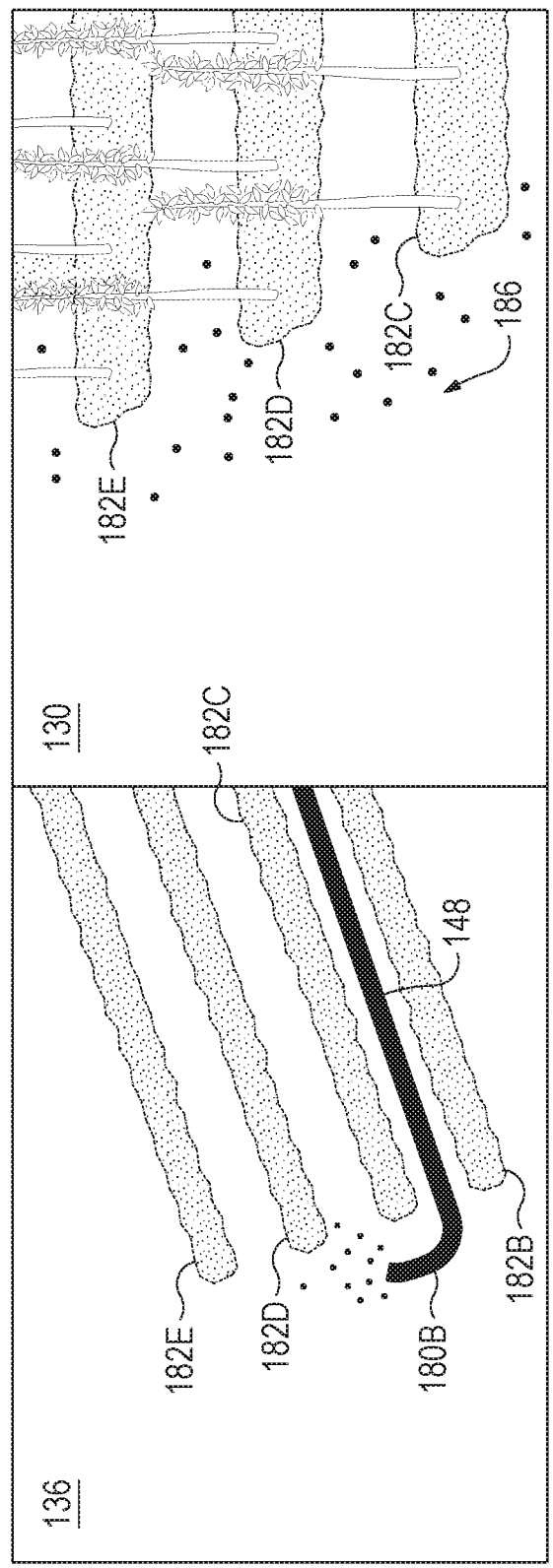
FIG. 8 shows VO and row detection data generated at a first stage of a vehicle end of row turn.
Figure 9:
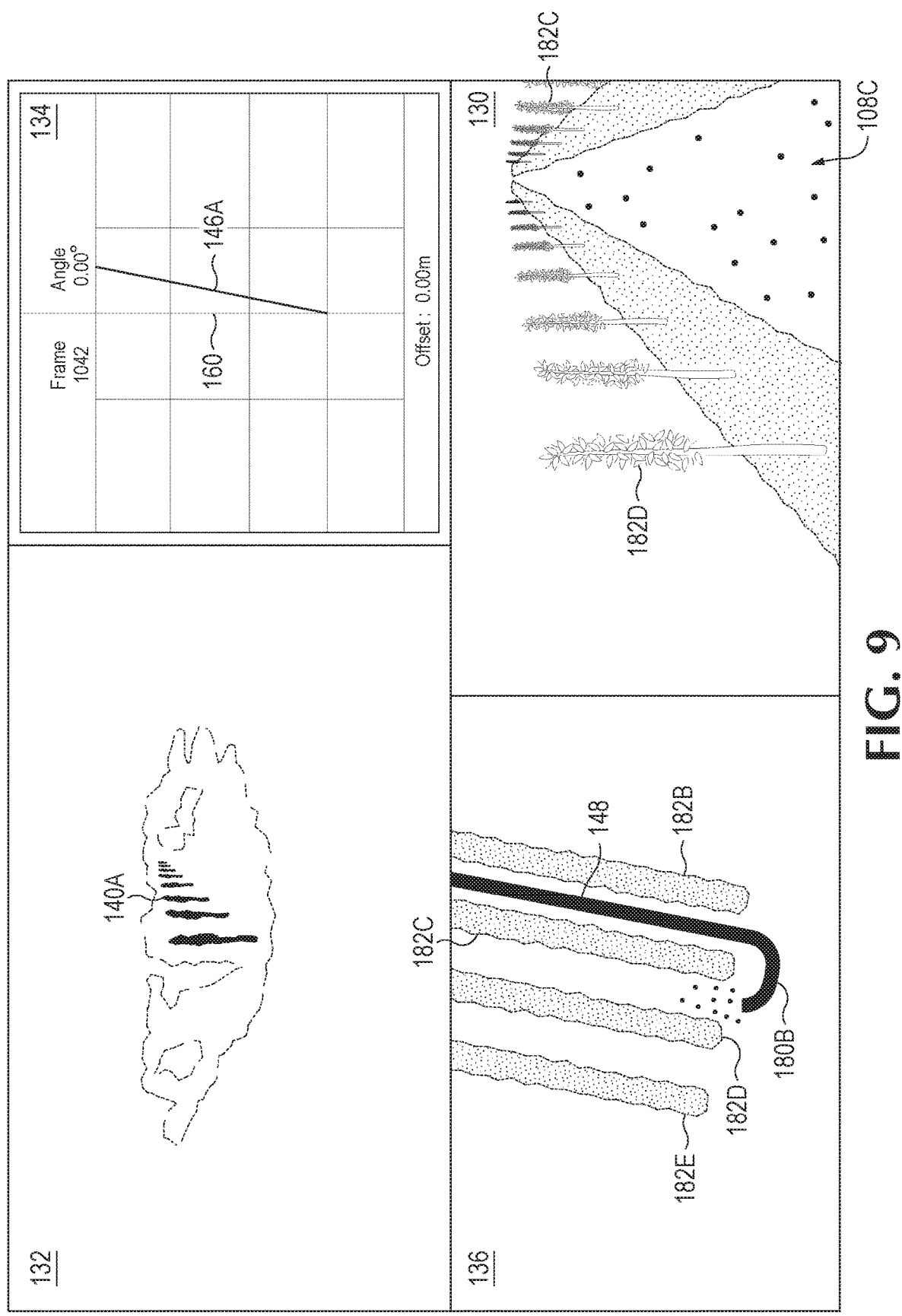
FIG. 9 shows VO and row detection data generated at a second stage of the vehicle end of row turn.
Figure 10:
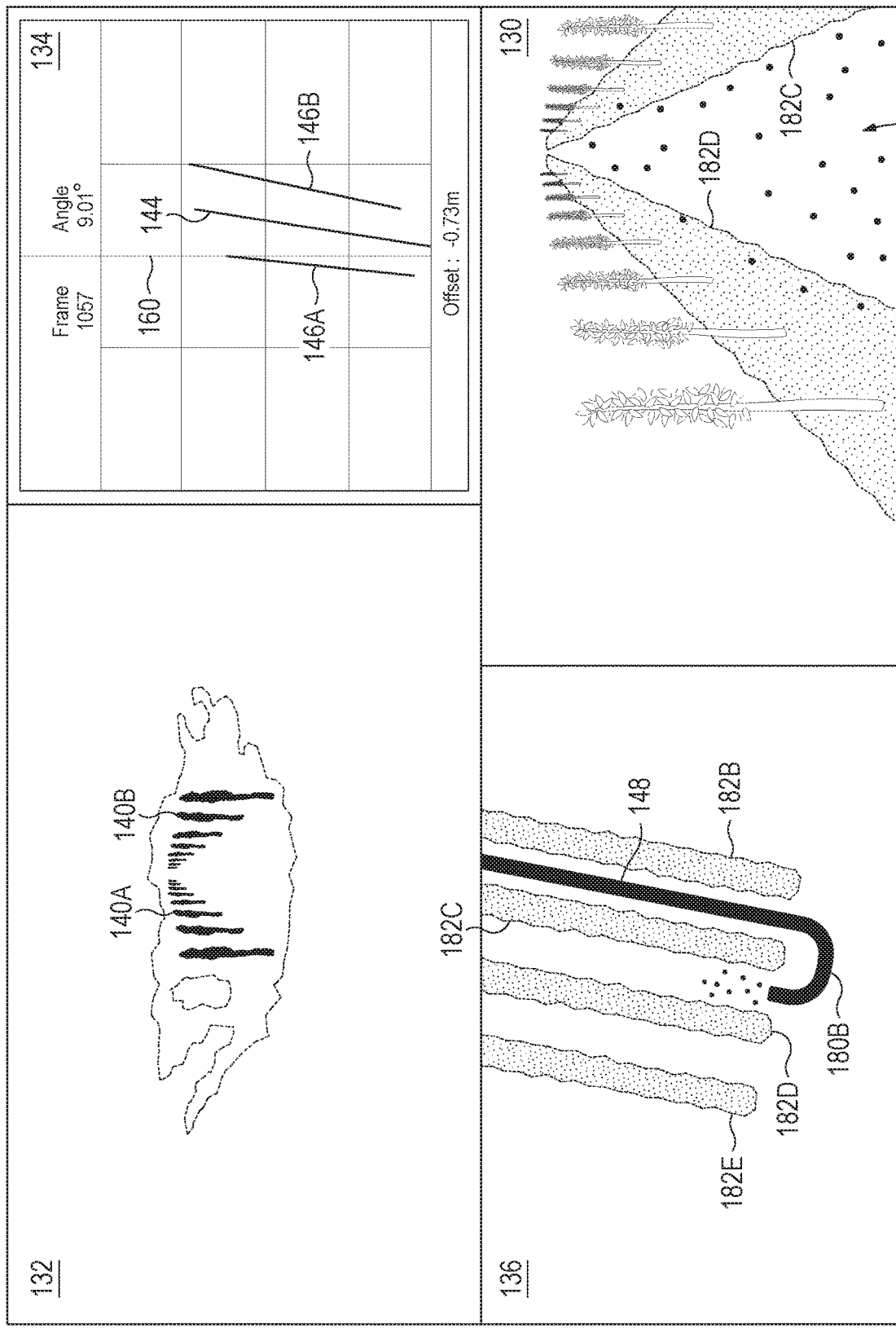
FIG. 10 shows VO and row detection data generated at a third stage of the vehicle end of row turn.

FIGS. 8-10 show in more detail how control system 108 performs end of row turn 180B. FIG. 8 shows VO pose 148 of vehicle 100 after initiating turn 180B at the end of row 182A. Control system 108 performs turn 180B to reach the start of next row 182C. Control system 108 may have one or more pre-stored paths or steering directions for steering vehicle 100 a known distance from the end of row 182A to the start of row 182C. Control system 108 continues to generate image data 130 and associated VO data 136 during turn 180B. Image data 130 in FIG. 8 shows the headland area 186 at the ends of multiple different rows 182C-182E.

FIG. 9 shows a next stage of turn 180B where 2-D images 130 start capturing trees in row 182D and point cloud map 132 starts identifying a line of vertical objects 140A associated with row 182D. 2-D data map 134 may generate a line 146A that identifies the location of row 182D. Control system 108 again may display a red line along axis 160 indicating a centerline has not currently detected between two adjacent rows 182.

VO data 136 continuously maps the pose of vehicle 100 during turn 180B. As mentioned above, if available, control system 108 may localize VO position 148 with available GNSS lat/long data. Otherwise, control system 108 may perform turn 180B and store associated VO data 148 as SLAM map 166 without GNSS assistance.

FIG. 10 shows a next stage of turn 180B where 3-D image data 130 starts capturing trees in both rows 182C and 182D. Control system 108 generates point cloud data 132 that identifies two rows of vertical objects 140A and 140B associated with rows 182D and 182C, respectively. Control system 108 generates 2-D data map 134 that now displays centerline 144 between lines 146A and 146B representing rows 182D and 182C, respectively.

Centerline 144 is not aligned with vertical axis 160 indicating vehicle 100 is not yet aligned with path 180C. Control system 108 continues to steer vehicle 100 to optimize the path from its current pose to get to steer along the center line. Control system 108 then starts steering vehicle 100 along the centerline/desired path 180C between rows 182C and 182D. Control system 108 continues to store VO data 148 for the completion of turn 180B and along path 180C forming part of SLAM map 166 in FIG. 6.

Figure 11:
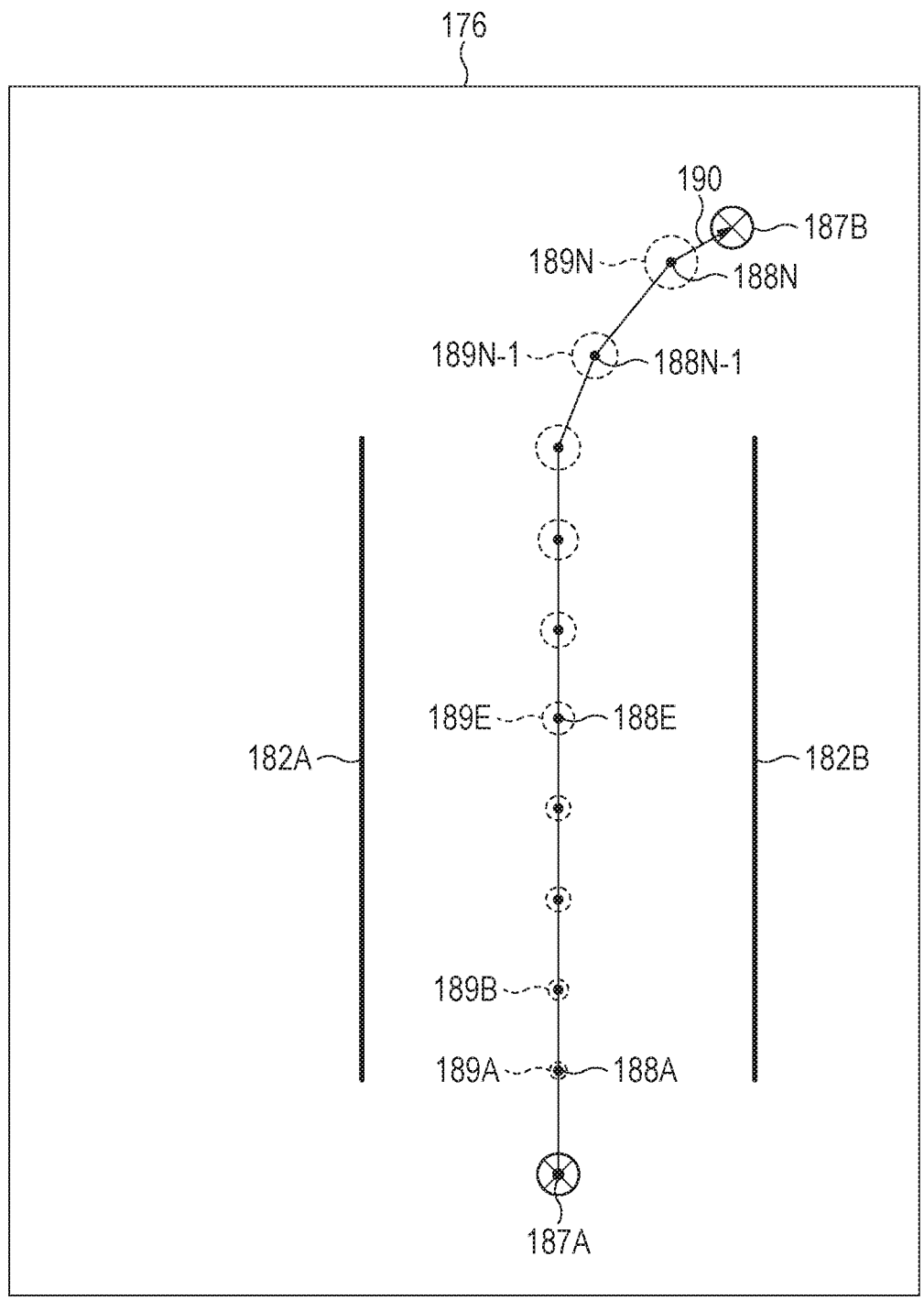

FIG. 11 shows an example of how control system 108 uses GNSS data to localize VO/SLAM map 166. A GNSS reading 187A is taken prior to vehicle 100 moving in-between rows 182A and 182B of field 176. Control system 108 calculates a first VO measurement 188A as vehicle 100 moves in-between rows 182. Dashed circles 189A, 189E, 189N-1, and 189N represent drift related uncertainty of VO positions 188.

Another GNSS reading 187B is taken at VO position 188N when vehicle 100 exists rows 182. As explained above, control system 108 determines the VO derived lat/long at VO position 188N by adding VO position 188N to the previously identified GNSS position 187A. The difference between VO measured lat/long position 188N and GNSS measured position 187B is VO error 190.

Control system 108 recalculates each stored VO measurement 188A, 188E, 188N-1, and 188N based on VO error 190. For example, the latitudinal distance of VO position 188N may be 100 meters and the latitudinal distance of GNSS position 187B may be 102 meters. Control system 108 may recalculate each VO position measurement 188 by adding the valid GNSS observations into the VO calculations.

For example, control system 108 may store key frames at different times and track movements of features identified in the key frames. Control system 108 may recalculate how the features move relative to the stored key frames based on using GNSS when the quality is high enough e.g. on the headland of the field. For example, control system 108 may use a bundle adjustment approach to calculate the camera poses. By adding GNSS into the bundle adjustment as control points, the trajectory of camera poses can be calculated to match the known GNSS observations.

Control system 108 may localize the VO calculations any time reliable GNSS data is received. For example, a canopy formed by trees may open up in the middle of rows 182. Control system 108 may calculate an error between the latest VO measurement 188 and a current GNSS reading and recalibrate subsequent VO measurements 188 in the row based on the error.

Obstacle Detection

Figure 12:
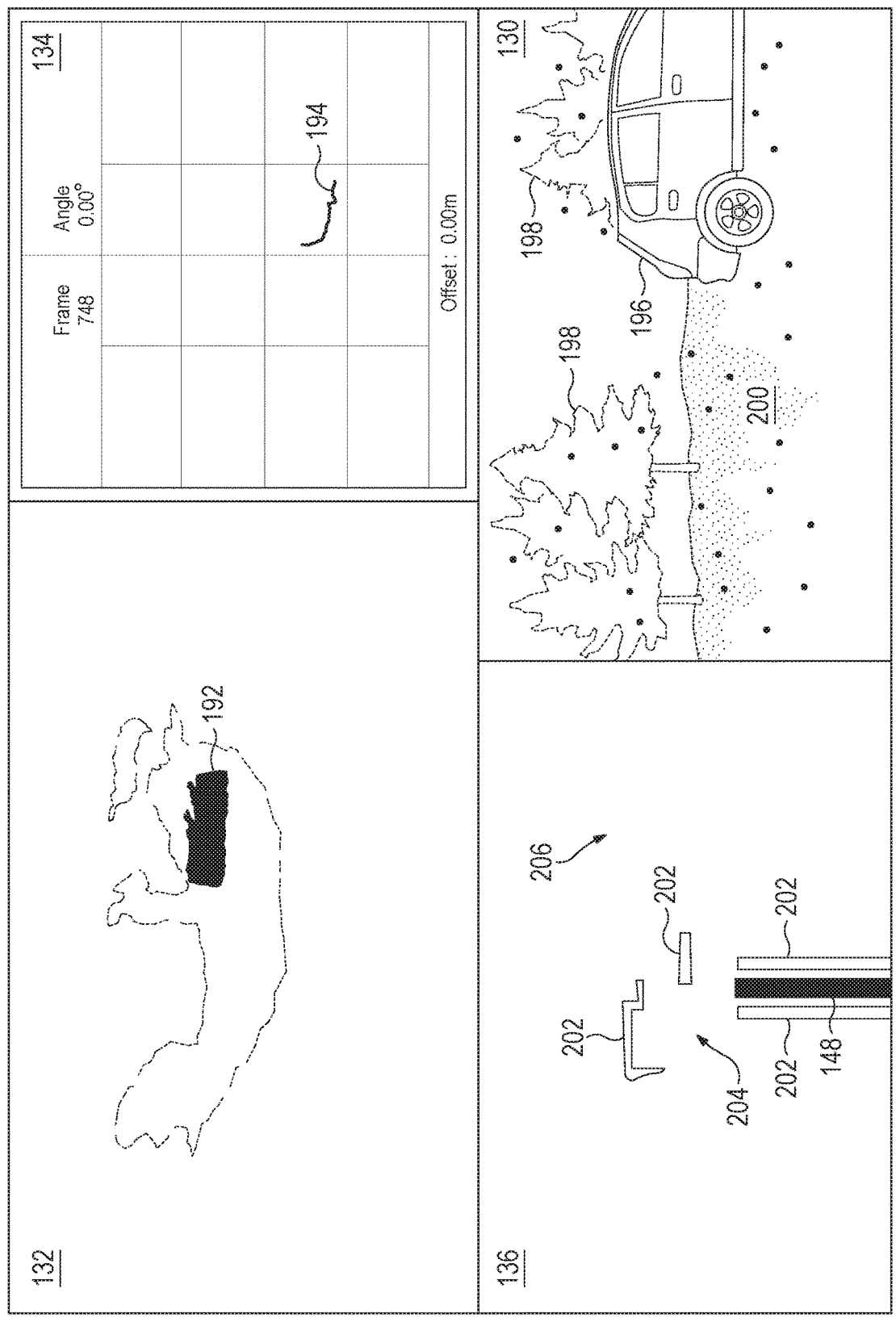
FIG. 12 shows image data identifying obstructions in a headland area.

FIG. 12 shows how control system 108 detects obstacles in different areas of a field. For example, 3-D camera 102 captures images 130 from the headland area at the end of a row. The headland area includes a car 196, trees 198 and a free area 200. Point cloud map 132 identifies that voxels in the 3D world is occupied above ground level 192 and the location of these voxels above ground is mapped to the 2-D map 136. Control system 108 generates a map of occupied area 202 in VO map data 136 representing the rows in the field, trees 198, and car 196. Other headland areas 200 are identified as free space 204 or unobserved areas 206. Control system 108 may generate a path to a next row that avoids obstructions 202.

Figure 13:
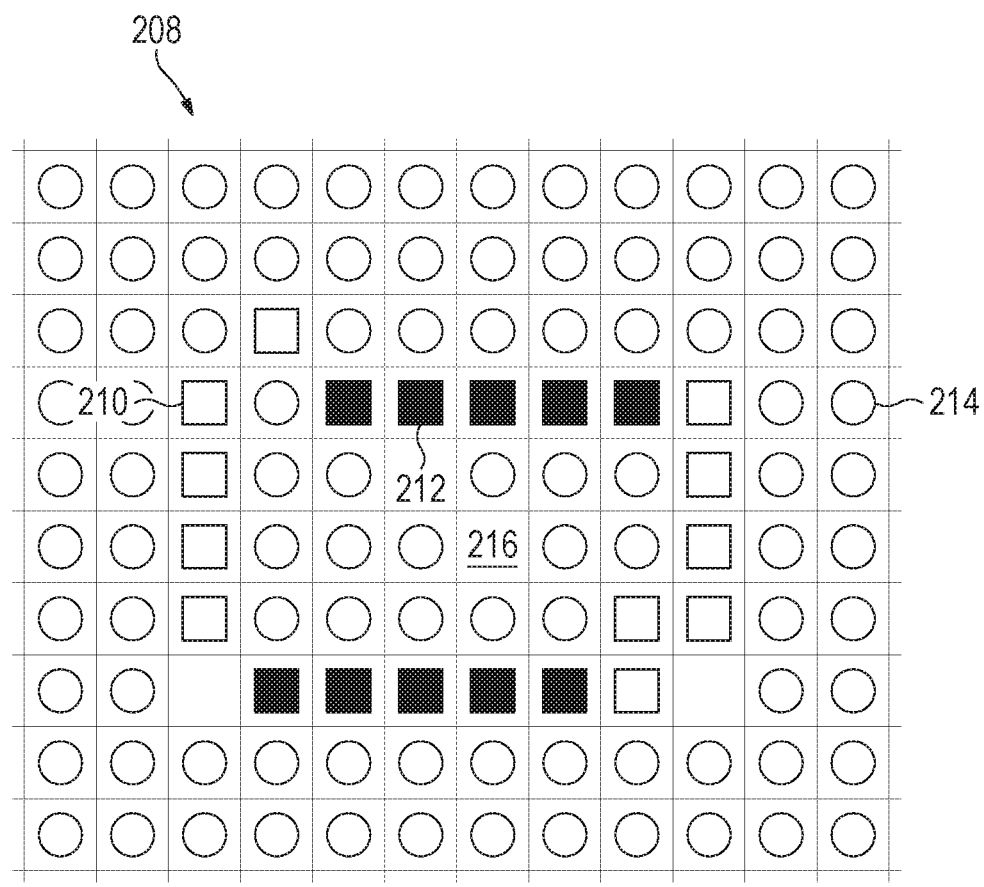
FIG. 13 shows an occupancy map generated by the control system to identify obstructions.

FIG. 13 shows how control system 108 creates an occupancy map 208 that includes an occupancy grid and empty corresponding preliminary free spaces 210. Control system 108 scans traveled areas with 3-D camera 102. Any point-cloud objects detected above the ground level are entered into an associated occupancy grid cell as obstacles 212. All cells between the obstacle and a current vehicle position are marked as free space 216. All other grid cells are marked as unknown 214. Control system 108 uses occupancy map 208 to chart a course around identified obstacles 212.

Figure 14:
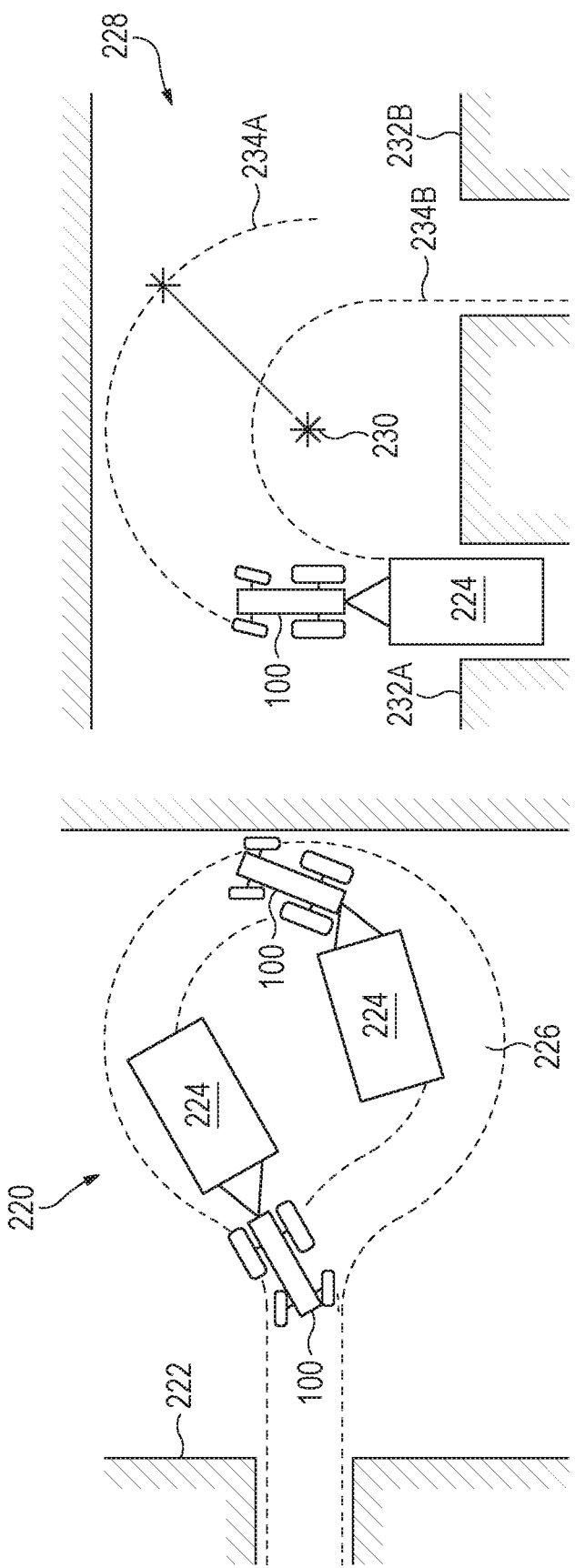
FIG. 14 shows different turn paths used by the control system based on identified obstructions and row locations.

FIG. 14 shows how control system 108 selects a vehicle path that avoids obstacles. Control system 108 may not detect any obstacles within a headland area 220. Accordingly, control system 108 may select a turnaround path 226 based on the location of rows 222 and the size of headland area 220. In this example, path 226 steers vehicle 100 back into the same path between rows 222.

FIG. 12 shows how control system 108 detects obstacles in different areas of a field. For example, 3-D camera 102 captures images 130 from the headland area at the end of a row. The headland area includes a car 196, trees 198 and a free area 200. Point cloud map 132 identifies that voxels in the 3D world is occupied above ground level 192 and the location of these voxels above ground is mapped to the 2-D map 136. Control system 108 also may generate a 2-D line 194 representing car 196 (similar to 2-D line 162 of FIG. 5). Control system 108 generates a map of occupied area 202 in VO map data 136 representing the rows in the field, trees 198, and car 196. Other headland areas 200 are identified as free space 204 or unobserved areas 206. Control system 108 may generate a path to a next row that avoids obstructions 202.

Sensor Fusion to Detect End of Rows

FIGS. 15-18 show how control system 108 uses sensor fusion to detect the end of a row. Control system 108 may fuse map distance information with measured distance information while also taking into account VO drift and also consider GNSS position and GNSS signal quality. Control system 108 also may take into account position data identified in a SLAM map if available and 3-D image data Fused end of row detection avoids false positives that could turn vehicle 100 when there is no headland area. Fused end of row detection also avoids false negatives, such as steering vehicle 100 completely across an undetected headland area.

Figure 15:
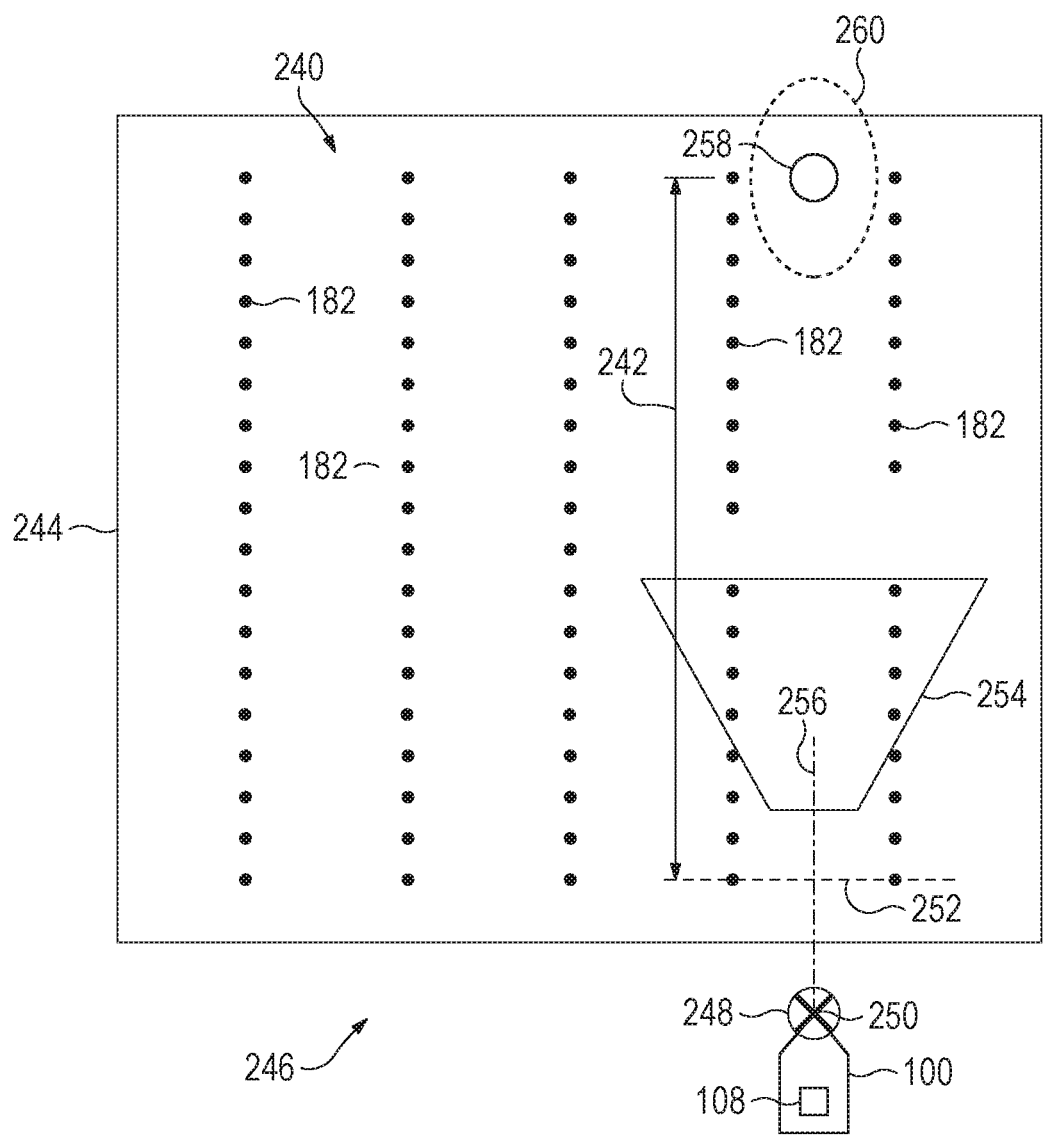

FIG. 15 shows vehicle 100 prior to traveling between rows 182 in a field 240. A digital map 246 may identify the locations and/or lengths of each row 182. Control system 108 initializes visual odometry/SLAM (VO) and starts capturing images at start of row location 252 from a VO frame origin 250. A VO end of row (EOR) uncertainty 260 corresponds to the drift in the VO location while vehicle 100 travels along rows 182.

GNSS receiver 104 has good GNSS reception outside of area 244 meaning GNSS signals currently have a relatively small uncertainty 248. In other words, there is a relatively high probability the GNSS data is providing a relatively accurate vehicle location. A GNSS end of row (EOR) uncertainty 258 is also relatively small since current GNSS uncertainty 248 is low and distance 242 to the end of row 182 is known from map 246.

Figure 16:
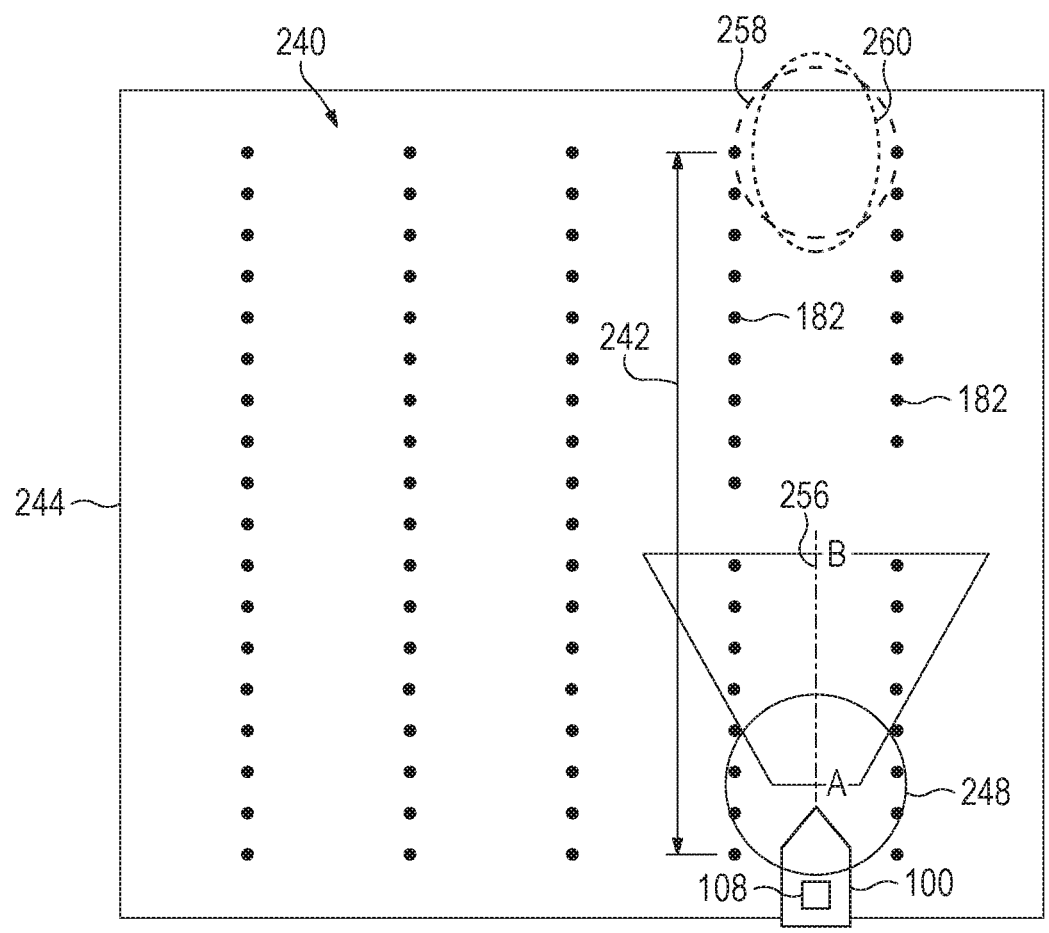

FIG. 16 shows a next state where control system 108 steers vehicle 100 along a centerline 256 between adjacent row 182. As explained above, control system 108 generates a 2-D map with two lines that identify the location of the two adjacent rows 192. Control system 108 then identifies centerline 256 between the two row lines and steers vehicle 100 along centerline 256. During this second state, control system 108 uses visual odometer/SLAM (VO) to track the position of vehicle 100 while traveling between rows 182. The canopy created by the trees in rows 182 may create poor GNSS reception. Accordingly, GNSS signals now have a larger uncertainty 248 and larger associated end or row 258.

FIG. 17 shows a next state where the 3-D data incorrectly identifies an end of row 262. For example, there may be one or more gaps 264 in rows 182 that the 3-D image data identifies as end of row 262. Control system 108 uses the 3-D data, VO data, and GPS data to determine if 3-D data end of row location 262 is incorrect.

Control system 108 uses a probability graph 268 that includes a horizontal axis representing travel distance and a vertical axis representing probability. Control system 108 can determine probabilities 270, 272, and 274 in FIG. 18 for 3-D data end of row location 262, GNSS EOR location 258, and VO EOR location 260. Control system 108 may determine probabilities 270, 272, and 274 based on GPS signal strength, known VO signal drift, and other derived probability distributions based on repeated passes through rows 182.

Control system 108 determines that the location of 3-D data EOR 262 is substantially shorter than the location of VO EOR 260 and the location of GNSS EOR 258. The probability of 3-D data EOR 262 is also below a threshold 278 that control system 108 uses to determine a final end of row. The probability of VO EOR 260 is also substantially the same as the probability of GNSS EOR 258. Control system 108 may combine the probabilities 260 and 258 into a combined larger EOR probability 276. The probability of 3-D EOR 262 is also less than combined end of row probability 276. Accordingly, control system 108 ignores EOR detection 262 from the 3-D image data and continues steering vehicle 100 along A-B line 256.

FIG. 18 shows a state where the 3-D data, VO data, and GPS data all have overlapping end of row locations. GNSS EOR 258, VO EOR 260, and 3-D data EOR 262 also have a combined probability 276 exceeds the threshold 278 at location 280. Accordingly, control system 108 identifies location 280 is the end of rows 182.

If trees are missing just before the headland, the end of row may be detected too early due to a 3D data EOR indication 262 and the uncertainty of VO EOR 260 and GNSS EOR 258. This can be corrected when vehicle 100 drives into the headland and gets higher certainty GNSS data. Control system 108 may correct the VO/SLAM path EOR location and adjust the vehicle turnaround path. For example, control system 108 may turn another meter out away from rows 182 before turning around to the next row.

Control system 108 can also set limits that stop vehicle 100 and alert a remote operator to check the state of the system. For example, the VO data may indicate vehicle 100 has passed the end of row, but the GNSS data and 3D data indicate vehicle 100 has not passed the end of row. Control system 108 can send a notification message of the possibly erroneous VO data.

Figure 19:
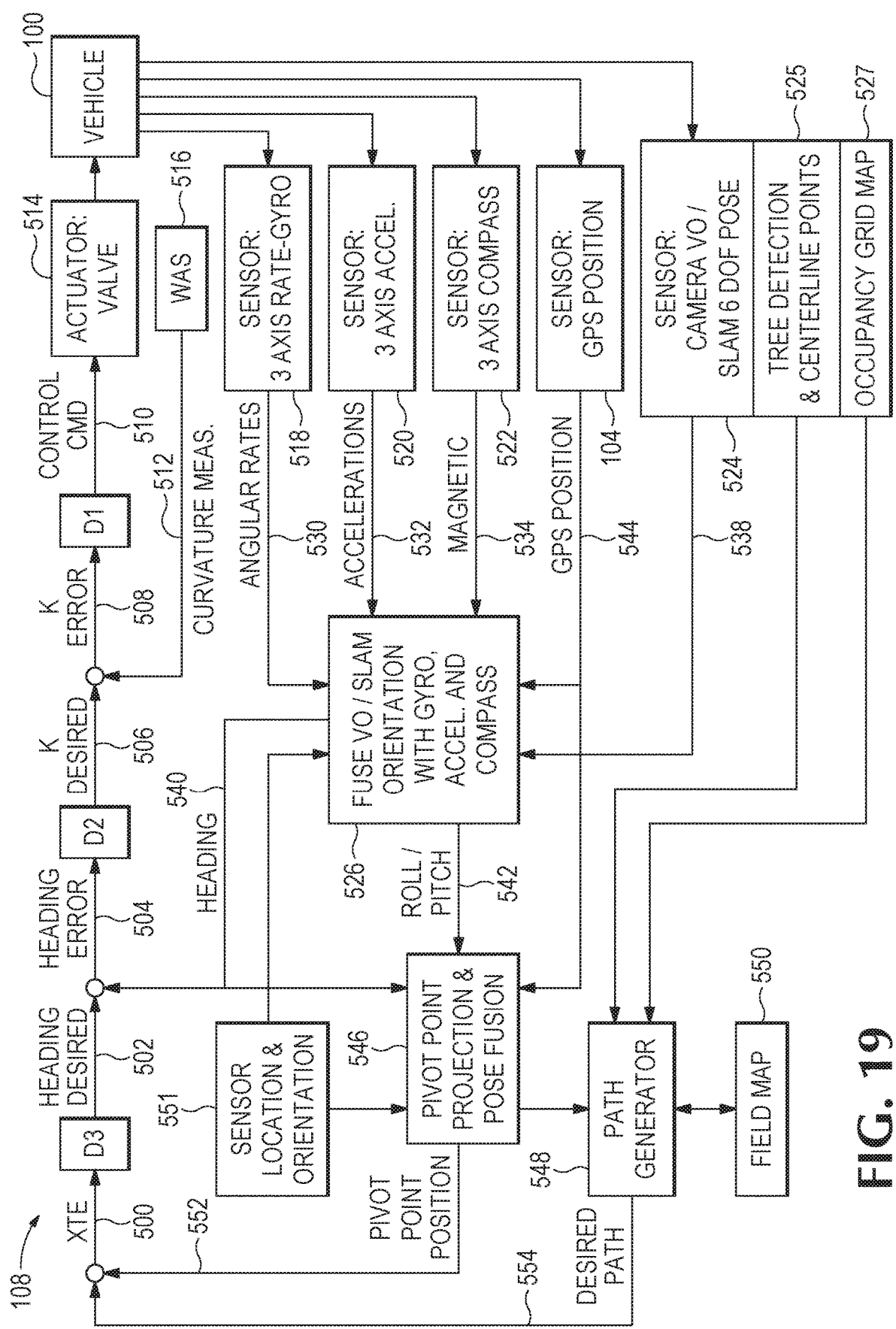
FIG. 19 is a diagram showing the control system of FIG. 1 in further detail.

FIG. 19 is a diagram showing control system 108 in more detail. Vehicle 100 includes a wheel angle sensor (WAS) 516 that generates curvature measurements 512 based on the steering angles of the wheels on vehicle 100. A fuse VO/SLAM controller 526 receives angular rates of vehicle movement 530 from a three axis rate gyroscope sensor 518, vehicle acceleration data 532 from a three axis accelerometer 520, and vehicle magnetic compass data 534 from a three axis compass 522. Three axis rate gyroscope sensor 518, three axis accelerometer sensor 520, and magnetic compass sensor 522 all may be part of INS 106 described above in FIG. 1.

VO/SLAM controller 526 also receives GPS position data 544 from a GNSS position sensor 104 and other possible heading and VO data 538 from an image processor 524 that receives 2-D and/or 3-D image data from 3-D image sensors 102 shown in FIG. 1.

VO/SLAM fusion controller 526 generates heading data 540 and roll and pitch data 542 for vehicle 100 based on angular rates 530 from gyroscope sensors 518, acceleration data 532 from accelerometers 520, magnetic data 534 from compass 522, GNSS position data from GNSS sensor 104, and VO data 538 from image processor 524. For example, VO fusion controller 526 may weight the different data based on the signal level strengths, amount of time since the sensors have been recalibrated, environmental conditions, etc. e.g. using and Extended Kalman Filter.

In one example, image processor 524 operates similar to image processor 105 in FIG. 2. Image processor 524 may identify six degrees of freedom pose for vehicle 100 based on VO/SLAM data generated from the 3-D image data. Image processor 524 detects tree lines and generates centerline points in operation 525 and generates an occupancy grid map in operation 527 as described above.

Memory in control system 108 may store sensor location and orientation data 551 that indicate the locations and orientations of all of the sensors located on vehicle 100. Location and orientation data 551 is used by VO/SLAM controller 526 and a pivot point projection and pose fusion controller 546 to adjust sensor data to a center-point on vehicle 100.

Pivot point projection and pose fusion controller 546 calculates a pivot point position 552 of vehicle 100 based on vehicle heading 540, vehicle roll/pitch data 542 from controller 526, GPS position data 544 from GNSS sensor 104, and sensor location and orientation data 551. Pivot point position 552 may be the current center point of vehicle 100, an articulation point between vehicle 100 and an implement, or any other reference point on vehicle 100 or an attached implement.

A path generator 548 determines a desired path 554 of vehicle 100 based on any combination of the 3-D image, VO data, and GNSS data as described above. For example, path generator 548 may use centerline points between two rows of trees identified by image processor 524 in operation 525 as desired path 554. The row centerline points are continuously detected by image processor 524 and sent to path generator 548 for continuous path optimization and elimination of drift in the VO pose to ensure that the vehicle steers accurately relative to the trees.

A memory device 550 may store a map 553 that path generator 548 uses to direct vehicle through the rows of a field as described above. For example, path generator 548 may use map 553 to generate desired path 554 that steers vehicle 100 to the beginning of a row. As explained above, map 553 may include any combination of GPS lat/long data, VO/SLAM data, and/or GIS data.

Path generator 548 also may identify the end of row based on the image data, VO data, and/or GNSS data received from image processor 524 and pivot point projection and pose fusion controller 546 as described above.

Path generator 548 may select a turnaround path, or derive the turnaround path, based on the distance and location between the end of the current row and the start of a next row as identified in map 553. Path generator 548 uses the identified turn path as desired path 554. As also explained above, path generator 548 may identify obstructions identified in occupancy grid map 527 to derive or select a desired path 554 that avoids the obstructions.

Control system 108 calculates a cross-track error (XTE) 500 between desired path 554 and the vehicle pivot point position 552 identified by pivot point projection 546. Cross track error 500 is the lateral distance between desired path 554 and current vehicle position 552. Control system 108 applies a gain value D3 to cross track error 500 to derive a desired heading 502. Control system 108 subtracts desired heading 502 from current vehicle heading 540 determined by VO/SLAM fusion controller 526.

Control system 108 applies a gain D2 to heading error 504 to derive a desired curvature (K) 506 and subtracts desired vehicle curvature 506 from measured vehicle curvature 512 to derive a curvature error 508. Control system 108 applies a gain D1 to curvature error 508 to derive a control command 510 that is applied to actuator valves 514 for steering vehicle 100. Control system 108 uses control commands 510 to steer vehicle 100 to the start of rows, through rows, and around headland areas to the start of a next row.

Figure 20:
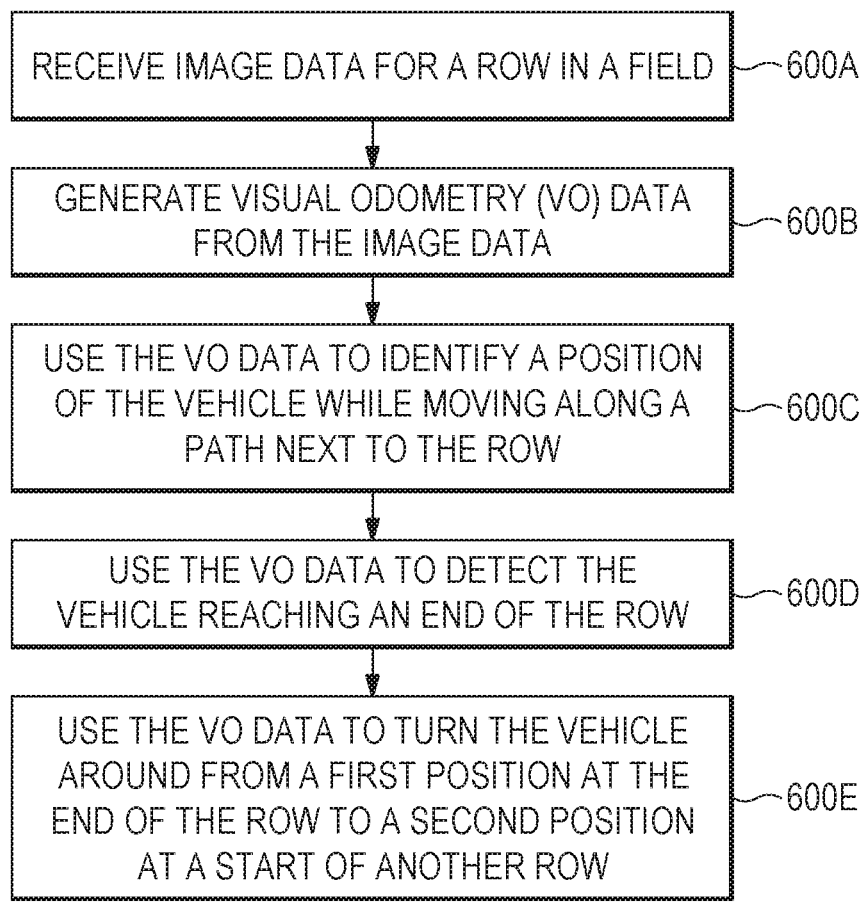
FIG. 20 is a flow diagram showing a process for using VO data to turn around a vehicle at the end of a row.

The description above explained how a control system controls a vehicle. Referring to FIG. 20, the control system may comprise one or more hardware processors configured to receive image data for a row in a field in operation 600A. In operation 600B, the control system may generate visual odometry (VO) data from the image data. In operation 600C, the control system may use the VO data to identify a position of the vehicle while moving along a path next to the row. In operation 600D, the control system may use the VO data to detect the vehicle reaching an end of the row. In operation 600E, the control system may use the VO data to turn the vehicle around from a first position at the end of the row to a second position at a start of another row.

The control system may detect an orientation of the vehicle at the end of the row based on the VO data and inertial data from an inertial navigation system (INS); and plan the turn of the vehicle based on the orientation of the vehicle.

The control system also may monitor the image data to detect the end of row; monitor the VO data to detect the end of row: monitor global navigation satellite system (GNSS) data received from a GNSS receiver to detect the end of row; and detect the end of row based on the image data. VO data, and GNSS data.

The control system also may determine a first probability for a first end of row location identified from the image data; determine a second probability for a second end of row location identified from the VO data; determine a third probability for a third end of row location identified from the GNSS data and determine the end of row based on the first, second, and third probabilities.

The control system may disregard the first end of row location when the first probability for the first end of row location does not overlap the second or third probabilities and is below a predetermined threshold.

The control system may identify the end of row when any combination of the first, second, and third end of row probabilities exceed a predetermined threshold. The control system also may identify one of the first, second, and third end of row locations preceding or exceeding the other end of row locations by a predetermined amount; and send a notification identifying the preceding or exceeding one of the end of row locations.

The control system may receive global navigation satellite system (GNSS) data from a GNSS receiver identifying the end of row location, and adjust the VO data so the end of row detected from the VO data corresponds with the end of row location identified with the GNSS data.

The control system may generate a point cloud map from the image data identifying two adjacent rows in the field; generate two lines corresponding with locations of the two adjacent rows; generate a centerline between the two adjacent lines indicating a desired path for the vehicle between the two adjacent rows; and steer the vehicle along the centerline.

Figure 21:
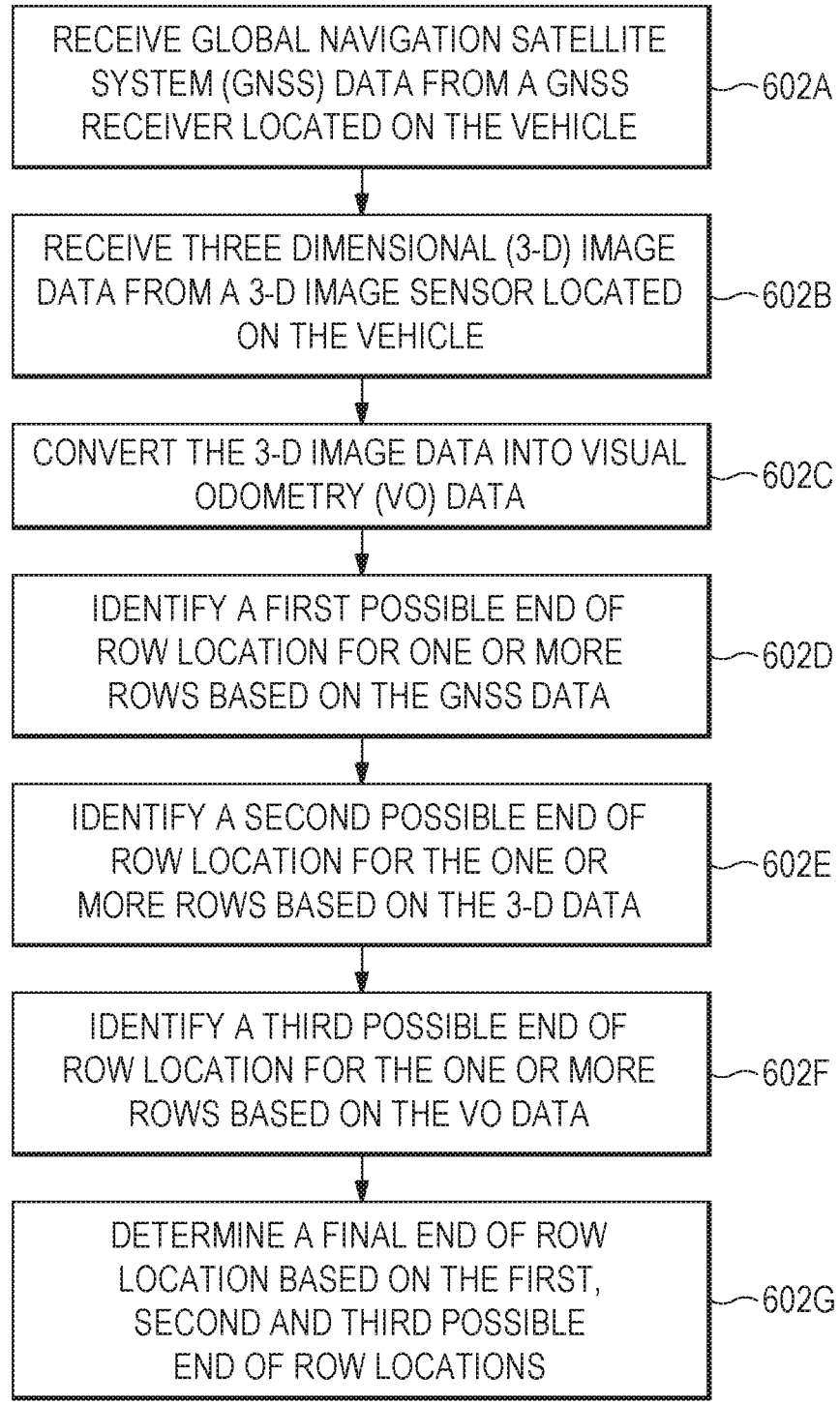
FIG. 21 is a flow diagram showing a process for using different types of data to determine an end of row location.

Referring to FIG. 21, a method for steering a vehicle in a field may include the control system in operation 602A receives global navigation satellite system (GNSS) data from a GNSS receiver located on the vehicle. In operation 602B, the control system may receive three dimensional (3-D) image data from a 3-D image sensor located on the vehicle. In operation 602C, the control system may convert the 3-D image data into visual odometry (VO) data. In operation 602D, the control system may identify a first possible end of row location for one or more rows based on the GNSS data. In operation 602E, the control system may identify a second possible end of row location based for the one or more rows on the 3-D data. In operation 602F, the control system may identify a third possible end of row location for the one or more rows based on the VO data. In operation 602G, the control system may determine a final end of row location based on the first, second and third possible end of row locations.

The method may include generating a simultaneous localization and mapping (SLAM) map from the VO data identifying a path of the vehicle around rows in the field: using the SLAM map to steer the vehicle in subsequent passes around the field; and updating the SLAM map in the subsequent passes around the field to reflect changes in the rows of the field and changes in areas around the field. The method also may include identifying a current location of the vehicle from the GNSS data; and adding the current location of the vehicle from the GNSS data to a current location of the vehicle in the SLAM map.

The method may include selecting a turnaround path in a headland area for steering the vehicle from the final end of row location to a start of a next row location; using the VO data to steer the vehicle along the turn-around path; and adding the VO data generated while steering the vehicle along the turnaround path to the SLAM map.

The method may include identifying obstructions in the headland area from the 3-D image data; adjusting the turnaround path so the vehicle avoids the obstructions; and using the VO data to steer the vehicle along the adjusted turn-around path. The method may include generating a two dimensional (2-D) map including lines corresponding with locations of two adjacent rows in the field; identifying a centerline between the lines; and using the centerline as a desired path for steering the vehicle between the two adjacent rows.

The method may include estimating positions of the vehicle from both the GNSS data and the VO data; and sending a most accurate one of the estimated positions as a national marine electronics association (NMEA) message to a server or another vehicle. The method may also include storing a geographic information system (GIS) map of the field; identifying different amounts of material for spraying on different regions in the GIS map: identifying the different regions of the GIS map where the vehicle is currently located based on the VO data and the GNSS data; and spraying the different amounts of material to the regions where the vehicle is currently located.

A computing device for steering a vehicle may comprise a processor; and storage memory storing one or more stored sequences of instructions which, when executed by the processor, cause the processor to: identify a starting location between two rows in a field; receive image data identifying the two rows in the field; generate lines identifying the locations of the two rows in the field: identify a centerline between the two lines; use the centerline as a desired path for steering the vehicle between the two rows in the field: generate visual odometry (VO) data from the image data captured while steering the vehicle between the two rows in the field; and use the VO data and the starting location to identify a position of the vehicle in the two rows of the field.

The instructions when executed by the processor may further cause the processor to identify an end of row location from the VO data: identify an end of row location from global navigation satellite system (GNSS) data from a GNSS receiver located on the vehicle; and adjust the VO data so the end of row location from the VO data corresponds with the end of row location from the GNSS data.

The instructions when executed by the processor, further cause the processor to select a turnaround path for steering the vehicle from the end of the two rows to the start of two other rows; and use the VO data to identify the position of the vehicle while steering the vehicle along the turnaround path.

Hardware and Software

Figure 22:
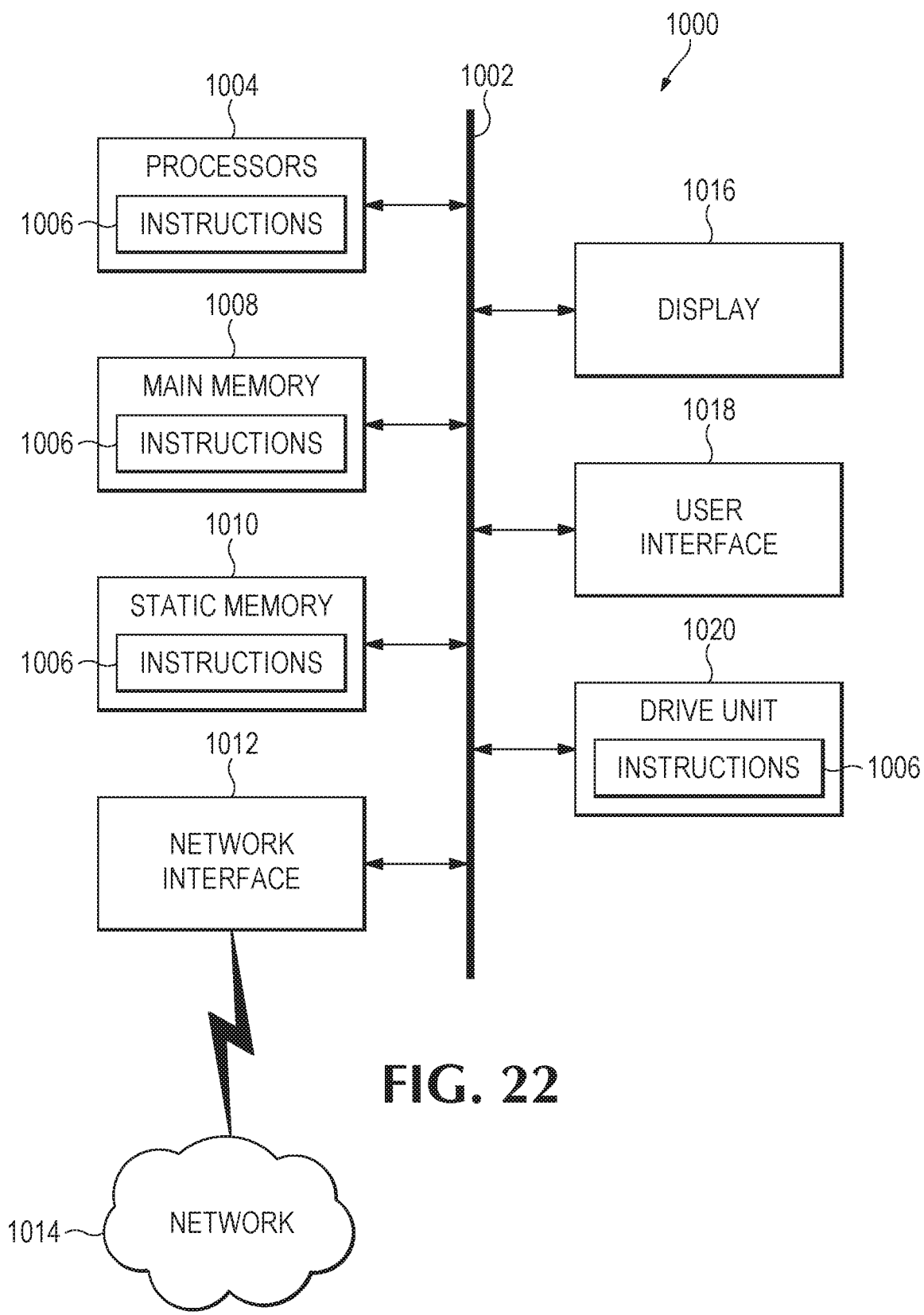
FIG. 22 shows a computer system used in the control system of FIG. 1.

FIG. 22 shows a computing device 1000 that may perform any combination of the processes discussed above. For example, computing device 1000 may be used in any portion of control system 108, guidance processor 6, and/or image processor 105. Computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, control system 108 above may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:
1. A computing device for steering, a vehicle, comprising:
a processor; and
storage memory storing one or more stored sequences of instructions which, when executed by the processor, cause the processor to:
identify a starting location between a pair of rows in a field;
receive image data identifying the pair of rows in the field;
steer the vehicle between the pair of rows in the field;
generate visual odometry (VO) data from the image data, wherein the image data is captured while steering the vehicle between the pair of rows in the field, wherein the generating the VO data includes calculating VO position measurements;
determine an end of the pair of rows when at least one criterion from a set of detection criteria is satisfied, wherein the set includes at least:
global navigation satellite system (GNSS) data is received from a GNSS receiver located on the vehicle and a GNSS latitude/longitude position in the received GNSS data matches a known end of row location in a stored electronic map; and
a length of a position line derived from the calculated VO position measurements reaches a row length value identified using the stored electronic map;

select a turnaround path for steering the vehicle from the determined end of the pair of rows to a start of a different pair of rows in the field;
steer the vehicle along the turnaround path; and
in a case that the GNSS data is received, recalculate the calculated VO position measurements based on the GNSS latitude/longitude position in the received GNSS data.

2. The computing device of claim 1, wherein steering the vehicle between the pair of rows in the field comprises:
generating a point cloud map from the image data;
generating a height histogram based on the point cloud map;
generating two lines from the height histogram, the two lines identifying locations of the pair of rows in the field;
identifying a centerline between the two lines; using the centerline as a desired path for steering the vehicle between the pair of rows in the field.

3. The computing device of claim 1, wherein the instructions when executed by the processor, further cause the processor to use the VO data and the identified starting location to identify a position of the vehicle while steering the vehicle between the pair of rows in the field.

4. The control system of claim 1, wherein the instructions when executed by the processor, further cause the processor to:
identify a first probability curve for a first possible location using the GNSS data;
identify a second probability curve for a second different possible location using the VO data;
calculate a combined probability curve of the first and second probability curves; and
determine the end of the pair of rows using the calculated combined probability curve.

5. The control system of claim 4, wherein determine the end of the pair of rows using the calculated combined probability curve includes comparing the first and second probability curves with the calculated combined probability curve.

6. A control system for controlling a vehicle, comprising:
one or more hardware processors configured to:
receive image data for a row in a field;
generate visual odometry (VO) data from the image data, wherein the generating the VO data includes calculating VO position measurements;
use the VO data to identify a position of the vehicle while moving along a path next to the row:
determine an end of the row when at least one criterion from a set of detection criteria is satisfied, wherein the set includes at least:
global navigation satellite system (GNSS) data is received from a GNSS receiver associated with the vehicle and a GNSS latitude/longitude position in the received GNSS data matches a known end of row location in a stored electronic map; and
a length of a positon line derived from the calculated VO position measurements reaches a row length value identified using the stored electronic map; and
turn the vehicle around from a first position at the end of the row to a second position at an end of another row; and
in a case that the GNSS data is received, recalculate the calculated VO position measurements using the GNSS latitude/longitude position in the received GNSS data.

7. The control system of claim 6, wherein the one or more hardware processors are further configured to:
detect an orientation of the vehicle at the end of the row based on the VO data; and plan the turning of the vehicle based on the orientation of the vehicle.

8. The control system of claim 6, wherein the one or more hardware processors are further configured to:
prior to the recalculating, generate a point cloud map from the image data identifying two adjacent rows in the field;
prior to the recalculating, generate two lines corresponding with locations of the two adjacent rows, respectively;
prior to the recalculating, generate a centerline between the two lines indicating a desired path for the vehicle between the two adjacent rows and
use the generated centerline to guide the vehicle along the desired path.

9. The control system of claim 8, wherein the one or more hardware processors are further configured to:
generate a height histogram from the point cloud map; and
generate the two lines corresponding with the locations of the two adjacent rows from the height histogram, respectively.

10. The control system of claim 4, wherein the one or more hardware processors are further configured to:
identify a first probability curve for a first possible location using the GNSS data;
identify a second probability curve for a second different possible location using the VO data;
calculate a combined probability curve of the first and second probability curves; and
determine the end of the row using the calculated combined probability curve.

11. The control system of claim 10, wherein determine the end of the row using the calculated combined probability curve includes comparing the first and second probability curves with the calculated combined probability curve.

12. A method for steering a vehicle in a field, comprising:
receiving global navigation satellite system (GNSS) data from a GNSS receiver located on the vehicle;
receiving three dimensional (3-D) image data from a 3-D image sensor located on the vehicle;
generating a point cloud map from the 3-D image data;
generating a height histogram using the point cloud map;
generating lines from the height histogram, the lines identifying the locations of two adjacent rows in the field, respectively;
identifying a centerline between the lines;
using the centerline as a desired path for steering the vehicle between the two adjacent rows;
generating visual odometry (VO) data based on the 3-D image data, wherein the generating the VO data includes calculating VO position measurements;
determining an end of the two adjacent rows when at least one criterion from a set of detection criteria is satisfied, wherein the set includes at least:
a GNSS latitude/longitude position in the received GNSS data matches a known end of row location in a stored electronic map;
a length of a position line derived from the calculated VO position measurements reaches a row length value identified using the stored electronic map;
selecting a turnaround path in a headland area for steering the vehicle from the determined end of the two adjacent rows to a start of a next row;

using the VO data to steer the vehicle along the turn around turnaround path; and in a case that the GNSS latitude/longitude, position is received, recalculating the calculated VO position measurements using the GNSS latitude/longitude position in the received GNSS data.

13. The method of claim 12, including:

generating a simultaneous localization and mapping (SLAM) map from the VO data identifying a path of the vehicle around rows in the field;

using the SLAM map to steer the vehicle in subsequent passes around the field; and updating the SLAM map in the subsequent passes around the field to reflect changes in the rows of the field and changes in areas around the field.

14. The method of claim 13, including:

identifying a current location of the vehicle from the GNSS data; and adding the current location of the vehicle from the GNSS data to a current location of the vehicle in the SLAM map.

15. The method of claim 13, including:

adding the VO data generated while steering the vehicle along the turnaround path to the SLAM map.

16. The method of claim 15, including:

identifying obstructions in the headland area from the 3-D image data;

adjusting the turnaround path so the vehicle avoids the obstructions; and using the VO data to steer the vehicle along the adjusted turnaround path.

17. The method of claim 12, including:

estimating positions of the vehicle from both the GNSS data and the VO data;

comparing the positions of the vehicle from the GNSS data and VO data to determine a more accurate position; and sending a most accurate one of the estimated positions as a national marine electronics association (NMEA) message to a server or another vehicle.

18. The method of claim 12, including:

storing a geographic information system (GIS) map of the field;

identifying different an of material for spraying on different regions in the GIS map;

identifying the different regions of the GIS map where the vehicle is currently located based on the VO data and the GNSS data; and spraying the different amounts of material to the different regions where the vehicle is currently located.

19. The method of claim 12, further comprising:

identifying a first probability curve for a first possible location using the GNSS data;

identifying a second probability curve for a second different possible location using the VO data;

calculating a combined probability curve of the first and second probability curves; and determining the end of the two adjacent rows using the calculated combined probability curve.

20. The control system of claim 19, wherein determining the end of the two adjacent rows using the calculated combined probability curve includes comparing the first and second probability curves with the calculated combined probability curve.

* * * * *